(12) United States Patent
Staton et al.

(10) Patent No.: US 7,881,733 B2
(45) Date of Patent: Feb. 1, 2011

(54) METHOD AND SYSTEM TO MONITOR AND CONTROL DEVICES UTILIZING WIRELESS MEDIA

(75) Inventors: Houston Staton, Paseo Colón (CR); James Ashley, Sr., Anaheim, CA (US); James Ashley, Jr., Norco, CA (US); Patrick Mooney, Brea, CA (US)

(73) Assignee: Wirelesswerx International, Inc., Urbanizacion Marbella, Panama Canal Zone ( * ) Notice: Subject to any disclaimer, the term of this patent is extended or adjusted under 35 U.S.C. 154(b) by 0 days.

(21) Appl. No.: 11/158,720

(22) Filed: Jun. 21, 2005

(65) Prior Publication Data
US 2006/0099971 A1    May 11, 2006

Related U.S. Application Data

(63) Continuation-in-part of application No. 11/105,931, filed on Apr. 13, 2005.

(51) Int. Cl.
H04W 24/00 (2009.01)
H04M 3/00 (2006.01)

(52) U.S. Cl. .................... 455/456.6; 455/420

(58) Field of Classification Search .......... 455/420, 455/456.1–456.6; 340/628
See application file for complete search history.

(56) References Cited

U.S. PATENT DOCUMENTS

| | | |
|---|---|---|
| 3,518,674 A | 6/1970 | Moorhead et al. |
| 3,772,668 A | 11/1973 | Smith |
| 4,217,588 A | 8/1980 | Freeny, Jr. |
| 4,224,596 A | 9/1980 | Knickel |
| 4,688,026 A | 8/1987 | Scribner et al. |
| 4,819,860 A | 4/1989 | Hargrove et al. |
| 4,884,208 A | 11/1989 | Marinelli et al. |
| 4,958,645 A | 9/1990 | Cadell et al. |
| 5,142,281 A | 8/1992 | Park |
| 5,365,516 A | 11/1994 | Jandrell |

(Continued)

FOREIGN PATENT DOCUMENTS
DE    19960219    7/2001

(Continued)

OTHER PUBLICATIONS

International Search Report for International Application No. PCT/US2005/037529 Dated Mar. 6, 2006.

(Continued)

*Primary Examiner*—George Eng
*Assistant Examiner*—Michael Faragalla
(74) *Attorney, Agent, or Firm*—Greenberg Traurig, LLP

(57) ABSTRACT

A method and system of selectively communicating with one or more devices within pre-defined geographical zones is disclosed. A plurality of geographical zones is defined, each zone being defined by latitude and longitude attributes. A plurality of devices is associated with each geographical zone with which a portable device can communicate, the portable device having data representative of the plurality of geographical zones. The portable device also has a ground positioning unit receiver to obtain geographical coordinates of the portable device. If the portable device determines that its location is within one of the plurality of geographical zones, the portable device communicates with the devices in associated with the geographical zone.

26 Claims, 11 Drawing Sheets

U.S. PATENT DOCUMENTS

| | | | |
|---|---|---|---|
| 5,389,934 A | 2/1995 | Kass | |
| 5,528,248 A | 6/1996 | Steiner et al. | |
| 5,627,517 A | 5/1997 | Theimer et al. | |
| 5,642,303 A | 6/1997 | Small et al. | |
| 5,670,944 A | 9/1997 | Myllymäki | |
| 5,699,244 A | 12/1997 | Clark, Jr. et al. | |
| 5,796,634 A | 8/1998 | Craport et al. | |
| 5,917,405 A | 6/1999 | Joao | |
| 5,917,414 A | 6/1999 | Oppelt et al. | |
| 5,917,415 A | 6/1999 | Atlas | |
| 5,938,721 A | 8/1999 | Dussell et al. | |
| 6,002,994 A | 12/1999 | Lane et al. | |
| 6,014,089 A | 1/2000 | Tracy et al. | |
| 6,043,748 A | 3/2000 | Touchton et al. | |
| 6,102,856 A | 8/2000 | Groff et al. | |
| 6,177,905 B1 | 1/2001 | Welch | |
| 6,198,394 B1 | 3/2001 | Jacobsen et al. | |
| 6,236,358 B1 | 5/2001 | Durst et al. | |
| 6,243,039 B1 | 6/2001 | Elliot | |
| 6,317,605 B1 | 11/2001 | Sakuma | |
| 6,421,001 B1 | 7/2002 | Durst et al. | |
| 6,446,004 B1 | 9/2002 | Cao et al. | |
| 6,469,116 B2 | 12/2002 | Farringdon et al. | |
| 6,496,575 B1 | 12/2002 | Vasell et al. | |
| 6,509,830 B1 | 1/2003 | Elliott | |
| 6,579,231 B1 | 6/2003 | Phipps | |
| 6,611,206 B2 | 8/2003 | Eshelman et al. | |
| 6,617,969 B2 | 9/2003 | Tu et al. | |
| 6,625,457 B1 | 9/2003 | Raith | |
| 6,646,873 B2 | 11/2003 | Chu-Chia et al. | |
| 6,665,613 B2 | 12/2003 | Duvall | |
| 6,674,368 B2 | 1/2004 | Hawkins et al. | |
| 6,717,513 B1 | 4/2004 | Sandelman et al. | |
| 6,774,795 B2 | 8/2004 | Eshelman et al. | |
| 6,812,824 B1 | 11/2004 | Goldinger et al. | |
| 6,826,473 B1 | 11/2004 | Burch et al. | |
| 6,853,911 B1* | 2/2005 | Sakarya | 701/208 |
| 6,856,898 B1 | 2/2005 | Tompkins et al. | |
| 6,867,733 B2 | 3/2005 | Sandhu et al. | |
| 6,868,074 B1 | 3/2005 | Hanson | |
| 6,868,410 B2 | 3/2005 | Fortin et al. | |
| 6,909,891 B2* | 6/2005 | Yamashita et al. | 455/420 |
| 7,138,916 B2 | 11/2006 | Schwartz et al. | |
| 2001/0027378 A1 | 10/2001 | Tennison et al. | |
| 2001/0032236 A1 | 10/2001 | Lin | |
| 2001/0040513 A1 | 11/2001 | McDonald | |
| 2002/0059434 A1* | 5/2002 | Karaoguz et al. | 709/228 |
| 2002/0068544 A1* | 6/2002 | Barzilay et al. | 455/406 |
| 2002/0147006 A1 | 10/2002 | Coon et al. | |
| 2002/0196151 A1 | 12/2002 | Troxler | |
| 2003/0013462 A1 | 1/2003 | Adachi | |
| 2003/0149526 A1 | 8/2003 | Zhou et al. | |
| 2003/0163287 A1 | 8/2003 | Vock et al. | |
| 2004/0075553 A1* | 4/2004 | Ono | 340/539.13 |
| 2004/0152460 A1* | 8/2004 | La et al. | 455/426.1 |
| 2004/0201454 A1 | 10/2004 | Waterhouse et al. | |
| 2004/0220731 A1* | 11/2004 | Tucker et al. | 701/213 |
| 2005/0159883 A1 | 7/2005 | Humphries et al. | |
| 2005/0275549 A1* | 12/2005 | Barclay et al. | 340/628 |
| 2006/0015233 A1 | 1/2006 | Olsen et al. | |

FOREIGN PATENT DOCUMENTS

| | | |
|---|---|---|
| EP | 0915398 | 5/1999 |
| EP | 1345148 | 9/2003 |
| GB | 2322248 | 8/1998 |
| GB | 2369966 | 6/2002 |
| WO | WO0041428 | 7/2000 |
| WO | WO0135190 | 5/2001 |
| WO | WO0146926 | 6/2001 |
| WO | WO0163318 | 8/2001 |
| WO | WO03049060 | 6/2003 |

OTHER PUBLICATIONS

International Search Report for International Application No. PCT/US2005/037526 Dated Apr. 25, 2006.

WirelessWerx TrakWERX II SMS/Satellite Dual Mode Tracking Unit, Report, Nov. 17, 2003, 23 page(s).

WirelessWerx Training Outline, Report, Oct. 29, 2004, 49 page(s).

* cited by examiner

METHOD AND SYSTEM TO MONITOR AND CONTROL DEVICES UTILIZING WIRELESS MEDIA

RELATED APPLICATIONS

This application is a continuation-in-part of U.S. patent application Ser. No. 11/105,931, filed on Apr. 13, 2005 entitled "Method and System to Configure and Utilize Geographical Zones", which in turn claims the benefit of the prior filing date of U.S. Provisional Patent Application No. 60/625,467, filed Nov. 5, 2004. This application is related to U.S. Utility Patent Application entitled "Method and System to Monitor Persons Utilizing Wireless Media" Ser. No. 11/158,667, Express Mail Label No. EV641286437US). The contents of those applications are incorporated by reference herein.

1. Field of the Disclosure

This disclosure relates to systems and methods for monitoring and controlling devices, such as home appliances, or any other devices that are specific to a location. In particular, it relates to utilizing a wireless portable device to control and monitor multiple devices within a discrete location defined by a geographical zone. The geographical zone data being configured in the wireless portable device.

2. Background of the Disclosure

Systems and methods for monitoring and controlling personal devices are becoming widely used. Some systems utilize wireless devices that are generally single purpose devices with little to no computing power. Modern business and lifestyle scenarios require a high amount of bandwidth to carry heavy streaming of data to be analyzed by an ever-growing server based infrastructure. Current monitoring devices lack the computing power or the necessary configuration to attend every environment in which an individual operates.

SUMMARY OF THE DISCLOSURE

A PDA as provided herein, is a portable wireless device with high computing power. The PDA is portable by an individual, and communicates with other devices wirelessly. Furthermore, the PDA has the capability to store multiple configurations to control and monitor multiple environments. Each environment can also contain a multitude of devices that could be monitored and analyzed by the PDA. The PDA is an intelligent device that is only required to send data when an exception is met, threshold is exceeded or an anomaly is recognized. This system requires minimal bandwidth as well as a modest infrastructure to support the business case as mentioned above.

In one aspect, there is a method of selectively communicating with devices within pre-defined geographical zones. A plurality of geographical zones is defined, each zone being defined by predetermined attributes. At least one device within each geographical zone is associated with a portable device with which it can communicate. The portable device is provided with a ground positioning unit receiver. Data representative of the plurality of geographical zones is loaded to the portable device. Geographical coordinates of the portable device are obtained from the ground positioning unit receiver. The location of the portable device is determined in relation to at least one of the plurality of geographical zones. Communication with the at least one device associated to the at least one geographical zone is established when the portable device determines it is within the at least one geographical zone. The predetermined attributes can be latitude and longitude attributes.

The portable device can be anyone of a cell mobile phone, a smart phone, or a personal data assistant. The geographical zone is at least one of a home environment, a work environment, a state, a city, a commercial neighborhood, a residential neighborhood, or a school zone.

In another aspect, the method further comprises providing a module communicatively coupled to at least one device associated to the at least one geographical zone, the module behaving as a hub for communication between the at least one device and the portable device.

The communication signal between the portable device and the plurality of devices can be any one of a Bluetooth signal, an infrared signal, a short range radio signal, wireless universal serial bus, or Wi-Fi. The at least one device can be a measuring instrument that measures the levels of at least one of carbon monoxide, chlorine, smoke, smog, oxygen in the air, or temperature.

In another aspect, the method further comprises the steps of permitting the at least one device to transmit a signal to the portable device indicating the occurrence of the event, and permitting a microprocessor in the portable device to execute a preconfigured operation if the microprocessor in the portable device determines that the event occurred triggers the execution of the preconfigured operation.

In another aspect, the data representative of each geographical zone is a plurality of coordinates, wherein the portable device creates a further representation of the geographical zone using the plurality of coordinates by performing the steps of: mapping the coordinates on a pixilated image so as to assign one pixel to each coordinate of the plurality of coordinates, wherein the distance between each assigned pixel is configurable, connecting the plurality of assigned pixels with lines forming a contiguous and connected line that encloses an area in the pixilated image, and activating the pixels that lie on the lines in order to form a contiguous array of pixels that enclose a shape in the pixilated image.

In yet another aspect, the data representative of each geographical zone is a plurality of waypoints, each waypoint in the plurality of waypoints being defined by a geographical coordinate and a radius; wherein the geographical coordinate is represented by a latitude and longitude, and the radius is represented by a distance magnitude.

In another aspect, data representative of each geographical zone is a pixilated image created performing the steps of allowing a user to identify a geometrical zone in a computer map using two coordinate attributes, dividing the identified geometrical area into a grid, allowing a user to select at least one section from within the grid in order to define a geographical area, and associating the at least one section to a pixel in a pixilated computer image such that the pixels selected by the user in the identified geometrical area are identified as being in the geographical zone. When the grid is built or constructed by dividing the geometrical area, multiple sections are derived such that a high enough resolution to be able to correctly delineate the geographical zone is achieved.

In another aspect, the portable device is programmed to determine if certain conditions have occurred in the geographical zone, and when a condition occurs the portable device reports the occurrence to a control center or to a second portable device. A pre-programmed operation can be executed such as making a telephone call, reporting to a control center, starting an alarm.

In one aspect, there is a method of selectively communicating with devices in a remote environment. The method comprises providing an instrument module associated with a geographical location, enabling communication between the instrument module and a plurality of instruments located at the geographical location, enabling wireless communication between the instrument module and the portable device through a communications network, loading to the portable device data identifying the plurality of instruments associated with each geographical location and data identifying the corresponding instrument module, programming a microprocessor in the instrument module to determine the occurrence of an event related to data obtained from one of the plurality of instruments, and permitting the microprocessor in the instrument module to transmit an event message indicating the occurrence of the event to the portable device. The microprocessor in the portable device can execute a preconfigured operation if the microprocessor in the portable device determines that the event occurred triggers the execution of the preconfigured operation.

In one aspect, there is a system of selectively communicating with devices in a remote environment. The system comprises an instrument module associated with a geographical location, at least one instrument communicatively connected to the instrument module, the at least one instrument located at the geographical location, and a portable device wirelessly connected to the instrument module through a communications network, wherein the portable device is loaded with data identifying the at least one instrument and the corresponding instrument module. The instrument module includes a microprocessor that determines the occurrence of an event related to data obtained from the at least one instrument and transmits an event message indicating the occurrence of the event to the portable device.

BRIEF DESCRIPTION OF THE DRAWINGS

By way of example, reference will now be made to the accompanying drawings.

DETAILED DESCRIPTION

Figure 1:
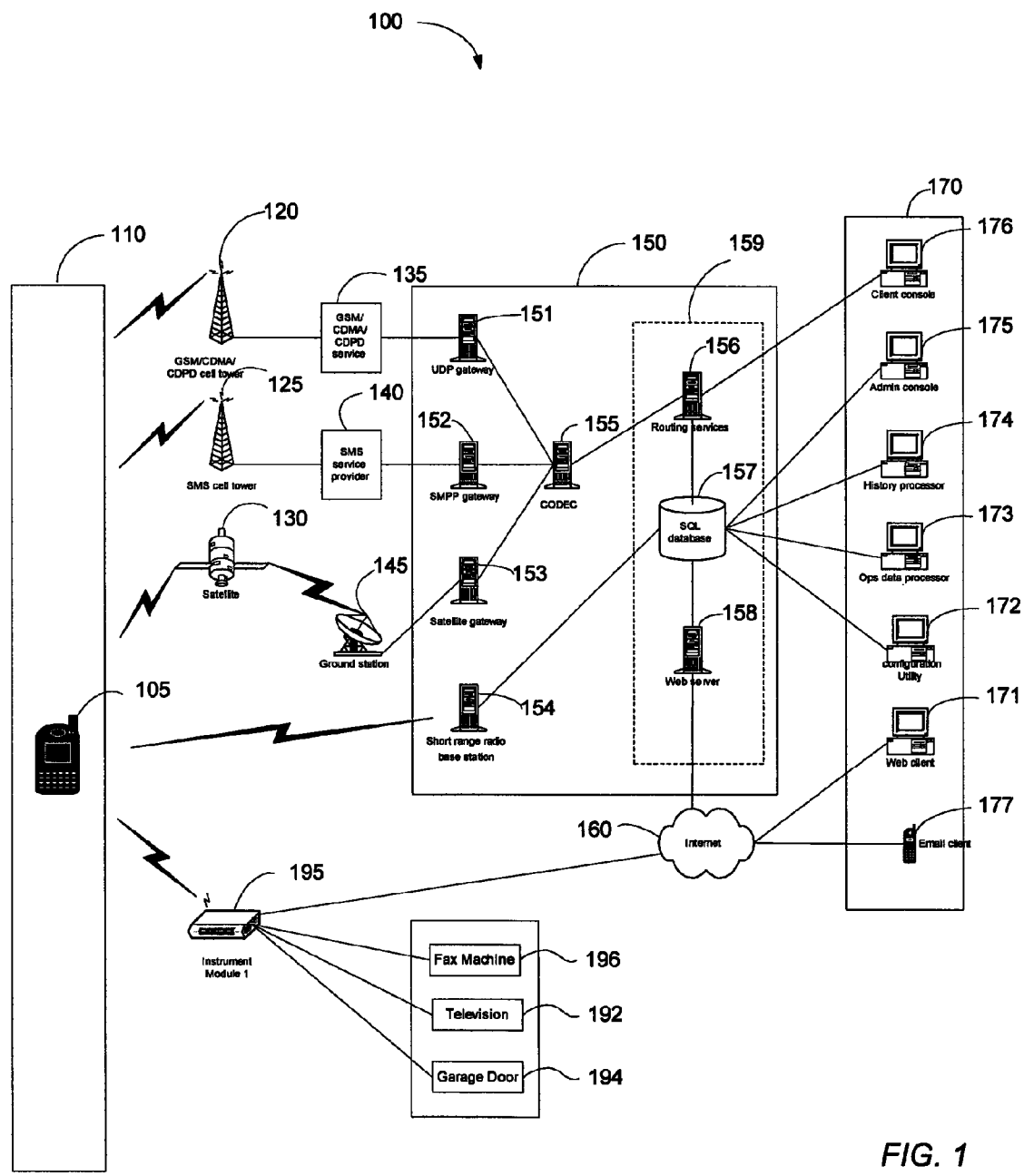
FIG. 1 illustrates the high-level architecture of a computer system and a PDA for controlling and monitoring devices.

The method and system described below utilizes a personal data acquisition and reporting system capable of measuring, time-tagging, logging, analyzing and controlling parameters and events associated with the multiple electronic devices. The system can comprise a PDA that communicates over cellular and satellite communication networks in combination with GPS positioning satellites capable of providing position and status information on a global scale. The PDA allows interaction with and control of a wide range of peripheral devices, including operating according to preconfigured geographical zones and events. The PDA may monitor and analyze health parameters heart rate, temperature, blood pressure, blood-sugar content, body implant transducers and medication devices, and can monitor emergency notifications. Furthermore, the PDA may detect geographical boundaries crossings, route and schedule adherence of a individual or host vehicle, reporting of position, speed, mileage, direction of travel, acceleration and altitude of the PDA, an individual or a host vehicle. The PDA can also monitor and analyze hazardous environmental conditions, including the detection of Oxygen, Carbon Monoxide, Chlorine, Natural Gas, smog and smoke concentrations. Furthermore, the PDA may monitor and remotely control home appliances.

The PDA may operate in multiple environments and interact with devices of each environment. The PDA uses GPS information combined with the information on the pre-stored geographical zones for changing the configurations relative to the changing environments. These pre-stored zones can be configured to form geographical boundaries into many shapes as the user desires. The PDA adapts and interacts differently with the devices of each environment.

Therefore, if the PDA were located in a vehicle, the PDA would communicate with the vehicle devices such a fuel valve through a local communications link (implemented by Bluetooth, short range radio, etc).

The portable device has substantial computing power so as to execute pre-programmed operations based on data obtained from devices associated with the each environment. Thus, the PDA has the features, flexibility, and capability of an intelligent device. The PDA contains an at least 32-bit processor which can interface with at least one modem (cellular, satellite, and others), at least one Global Positioning System (GPS) receiver, at least one memory module, and other peripheral devices. The processor permits the PDA the placement of logical analysis and decision-making capability in the PDA rather than a remote, server-based control center. Other components of the PDA may include, but are not limited is at least one GPS antenna, at least one modem antenna, at least one serial port for communication and configuration.

Among its many capabilities, the central processing unit of the PDA can be configured to manage configurable operations including operations to report, observe, recognize, process, and analyze numerous configurable events or configurable operations, give and respond to various commands, effectuate numerous events in its local installation, and contain a history recording component.

The PDA is configurable to include as few or as many configurable logical events as the user desires. Events may be based on rules using a combination of the GPS position and one other factor such as time or speed.

Configurable operations refer to those actions that the CPU in the PDA will execute. For example, a PDA that receives a home appliance event signal of malfunction could be configured to immediately dial the service company. Other configurable events or configurable operations include, but are not limited to, the turning on or off of an ignition to a vehicle; the temperature level or change thereof; the fuel tank level or change thereof; etc. The configurable operations or combinations thereof can be processed in order to transmit a specific message, respond to a specific query or command, enable or disable a specific mechanism, or recognize a specific event. The configurable events or configurable operations occur in many situations. These situations include, but are not limited to where configurable events or configurable operations occur in response to a command; where configurable events or configurable operations occur in response to a query, or where configurable or configurable operations events occur upon recognition of pre-selected conditions.

Configurable boundaries or geographical zones can also be used and are configurable to any shape the user desires. For example, the boundary or zone can trace the border of a state line or trace the route of a selected highway or path. The boundary or zone can trace the border of the premises of a school zone, a no-fly zone, a city, etc. The boundary or zone can also be a geometric shape or non-geometric shape. A further benefit of the present disclosure is that the PDA can be updated and configured locally or over-the-air.

The PDA is designed to be event driven, transmitting data only when exceptions are met. Exceptions are configured in the PDA as events. The event-driven approach limits the amount of data sent over-the-air and preserves bandwidth. This is accomplished using rules and thresholds that can be configured for any combination of internal and external data sources. When a rule is broken or threshold exceeded, a customer-defined event can be generated. The transmissions of these events are controlled by the transmission rules and operating configuration of the device.

An instrument module can be mounted, attached, manufactured, or otherwise included upon/in various articles or electrical devices. Such articles or electrical devices may include entertainment equipment, computer systems, environment condition sensors, health monitors any other item where monitoring or controlling its operation is beneficial. Within the context of the monitoring system, the instrument module works to collect, process, and communicate information about the article or electrical devices to which the instrument module is connected.

FIG. 1 illustrates the high-level architecture of the communications links of a PDA for controlling and monitoring devices. A PDA 105 receives radio signals from a GPS constellation 131 allowing the PDA 105 to identify its geographical position and geocode if necessary. The PDA 105 can communicate wirelessly to various networks through multiple wireless devices integrated in the PDA's 105 hardware. In one embodiment, such communications network is a cellular network including multiple cellular base stations 120 and service providers 135. In another embodiment, such communications network is a cellular network including multiple cellular base stations with SMS receivers 125 and service providers 140. In another embodiment, such communications network is a satellite network including multiple satellite receivers and transmitters 130 and satellite ground stations 145. In yet another embodiment, such communications network is a short range radio communications network.

The communications network permits the PDA 105 to communicate with a backend control system 150. The PDA 105 sends event information to backend control system 150 and responds to commands sent to the PDA 105 by the backend control system 150 through the communications network. The backend control system 150 includes a plurality of gateways 151, 152, 153 and 154 which interact with a codec 155. The codec 155 is the central codifier and decodifier of the backend control system 150 and allows the backend control system to adapt and communicate with any communications network. The modular design enables the introduction of new hardware and network protocols without having to change monitoring and reporting software. The backend control system 150 also includes an asynchronous routing system 159 that allows incoming and outgoing communications to be handled asynchronously and efficiently. In one embodiment, the asynchronous routing system 159 includes a plurality of routing services 156, at least one database 157 and a web server 158. The messages routed by the routing services 156 are directly communicated to a client console 176. The client console 176 presents instrument and PDA 105 information to the operator. The client console 176 sends to commands to the PDA 105 through the backend control system 150 and a communication network.

Multiple applications may connect to the central database 157 to provide further system functionality. An administrator console 175 permits operators to add, edit or delete PDA 105 information, instrument information, user information, etc. A history processor console 174 allows an operator to view reports and replay event data. An operations data processor 173 permits an operator to define geographical zones and waypoints for operation of the PDA 105. A configuration utility 172 permits operators to easily configure PDA 105 features and functionality.

Instrument information can be presented to the operator through alternative mediums besides a PDA 105. In one embodiment, instrument information can be presented to an operator through a website or an email by transmitting such information from a web server 158 to a web client 171. In another embodiment, instrument information can be presented to the operator by sending a text or voice messages to another predetermined wireless device 177.

The PDA 105 can communicate with multiple instruments or devices thorough an instrument module 195. In one embodiment, instrument module 195 is connected to a plurality of instruments or devices that the user would like to monitor or interact with. For example, the instrument module 195 can be connected to a television unit 192, a garage door opener 194, and to a fax machine 196. Depending upon configuration of the PDA 105, the PDA 105 can execute operations to turn on/off an instrument, query a measurement from the instrument, etc. The instrument module 195 can also be connected to the internet 160 in order to have connectivity with the web server 158 and the backend control system 150. The instrument module 195 can be configured to report a specific event or occurrence related to any of the instruments associated with the instrument module 195. The instrument module 195 reports such information through the internet 160 to the backend control system 150 and to the PDA 105. If the PDA 105 is within the vicinity, the instrument module 195 can transmit directly to the PDA 105.

Figure 2:
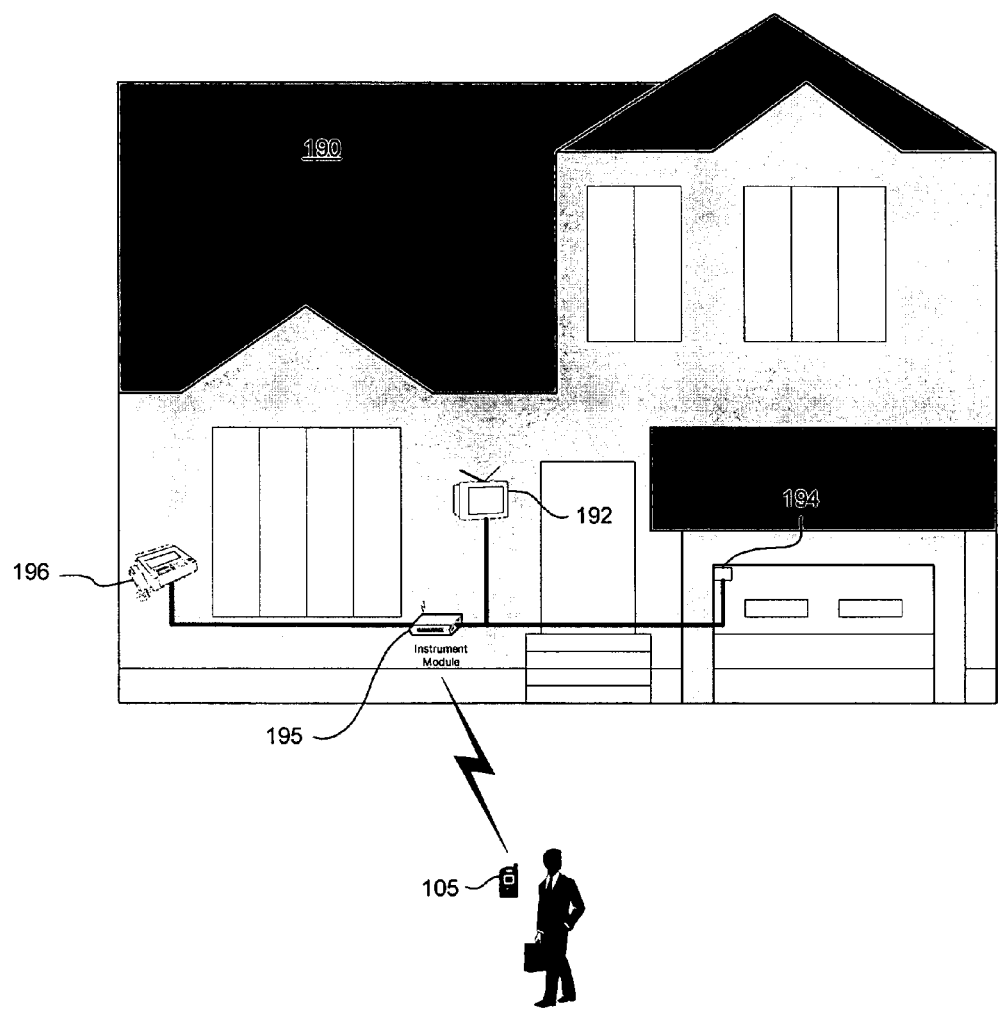
FIG. 2 illustrates an exemplary environment in which a PDA can monitor and control devices.

FIG. 2 illustrates an exemplary environment in which a PDA 105 can monitor and control devices. In one embodiment, the environment can be a home environment 190. The instrument module 195 can be installed in the home environment 190 in order to provide control and monitoring capabilities to the PDA 105. The PDA 105 interacts with the instrument module 195 through a wireless link of a known protocol such as Bluetooth, short-range radio, etc.

The instrument module 195, in turn, is connected to various instruments in the home environment. In one embodiment, these various instruments can be a television unit 192, a garage door opener 194, and a fax machine 196. The instrument module 195 is connected through a local area network or any other means of networking within a specific environment.

In one embodiment, if the instrument module 195 receives a signal from any of the connected instruments, the instrument module 195 would determine if there a preconfigured event has occurred at the instrument. For example, if a fax has arrived at the connected fax machine 196, the instrument module 195 may be configured to execute an operation upon the receipt of a fax. For example, the instrument module 195 may, through the internet connection 160 notify the PDA 105 that a fax has been received. If the PDA 105 is within the vicinity of the instrument module 195, the notification can be made through a direct wireless link to the PDA 105.

In another embodiment, the instrument module 195 can be configured with an event, such as detecting the presence of the PDA 105, receiving a message by the PDA 105, or calculating a time to take a measurement. Once the event occurs, the PDA 105 may execute a preprogrammed operation. For example, in receiving a message from the PDA indicating that the PDA 105 is present within the vicinity of the instrument module 195, the instrument module 195 then emits a signal to the garage door opener 194 to open the garage door. The garage door opener 194 receives the appropriate electrical signal from the instrument module 195 in order to operate such that the garage door is opened.

As such, the instrument module 195 may be configured to interact with any configured instrument and to execute an operation. Other examples of instruments within a home environment 190 with which the instrument module 195 can interact are an alarm system, a heating unit, an air conditioning unit, a dishwasher, a clothes dryer, a vault, etc.

In one embodiment, the PDA 105 can be programmed to emit a signal to the instrument module indicating when the PDA is within the range of the instrument module 195. The PDA 105 can recognize that it is within the home environment 190 by obtaining GPS position data and determining if it is within a preconfigured boundary. Using preconfigured irregular boundaries can be used, such as a neighborhood, or school zone, a worksite, etc. In another embodiment, the instrument module 195 simply assumes that the PDA 105 is always present.

The PDA 105 can also be configured with an operation to be executed when a configured event occurs. Such operation can be requesting information from the instrument module 195, commanding an operation at the instrument module 195, etc.

Hardware Configuration

Figure 3:
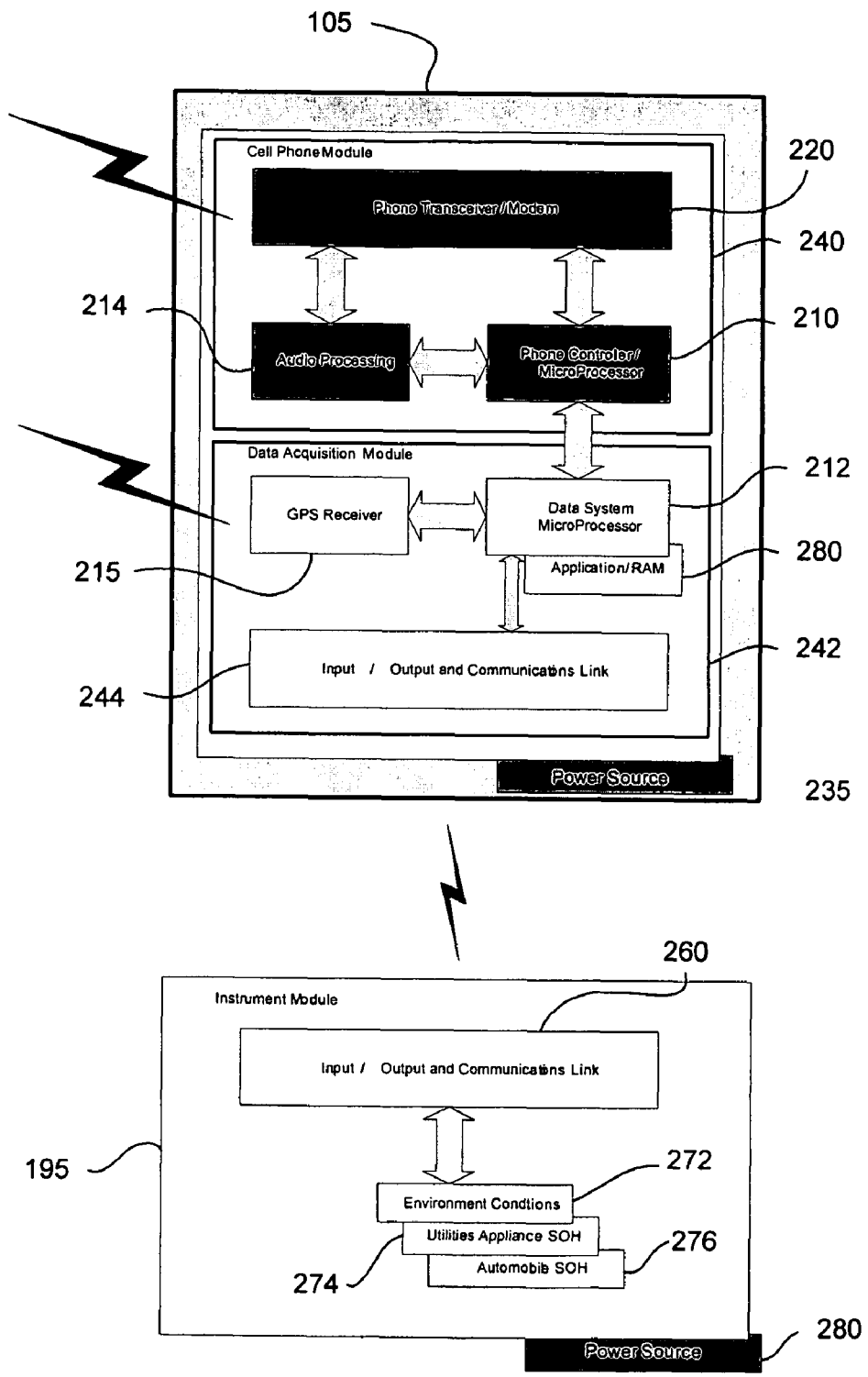
FIG. 3 illustrates a component layout of the PDA used in a system for controlling and monitoring devices.

FIG. 3 illustrates a component layout of a PDA used in a system for controlling and monitoring devices. In one embodiment, the PDA 105 has a cell phone module 240 and a data acquisition module 242. The cell phone module 240 contains at least one cellular modem 220, at least one CPU 210, and at least on audio processing unit 214. In another embodiment, a satellite communications modem can be included in the cell phone module 240 to provide the most affordable and complete global coverage.

The CPU 210 is a high performance processor with enough computing power to quickly perform complex calculations. In one embodiment, the processor 210 is at least a 32-bit processor. The processor 210 includes at least 32 Kilo-bytes of RAM. For example, a Motorola MMC2114 32-Bit RISC processor with two built-in UART's is contemplated. However, a similar or more advanced processor is also contemplated.

The data acquisition module 242 may include a global positioning system (GPS) receiver 215, a data system microprocessor 212, a memory module 280, and a communications link 244. The GPS receiver 215 is capable of positioning accuracy to within a few feet or less. For example, a 12-Channel Trimble SQ, Lapaic UV40, or small-range accurate receivers are contemplated. The memory module 280 includes at least two additional memory chips, wherein each additional memory chip is at least 128 Kb.

In one embodiment, the cellular modem 220 is the primary means for communication with the backend control system 150. The cellular modem 220 may be a GSM, CDMA or similar modem. The satellite modem or transceiver 230 can be external to the PDA 105 and connected to the PDA 105 by a serial port 340. Alternatively, the satellite modem 230 can be internal to the PDA 105.

The satellite modem 230 is primarily used only when there is little or no cellular coverage or when the user specifies use of the satellite modem 230. The efficient use of the satellite modem 230 functions to lower the cost of the tracking system to the user. One embodiment contemplates a satellite modem 230 such as a Sky Wave DMR-200 satellite modem. Similar contemplated satellite modems include features such as a built-in omni-directional antenna, provide worldwide coverage, and efficiently interfaces with the PDA's processor 210.

In one embodiment the communications link 244 is a Bluetooth transceiver 215 has a range of at least twenty meters. For example, in one embodiment, a National Semiconductor Simply Blue LMX9820 Class 2 Bluetooth module is contemplated. However, similar or more advanced Bluetooth receivers are contemplated any other radio connectivity which does not require a line of sight. The Bluetooth transceiver can be installed to utilize different capabilities such as integrating and supporting multiple wireless peripherals, acting as a short-range radio to download data, or to serve as a local, traveling wireless "hotspot."

The power source 235 can be a fused main power-in source with an operating voltage range between 12 and 24 volts. One embodiment contemplates low power consumption (65 mA or less) during normal operation. Furthermore, the PDA 105 includes a circuitry for charging an optional backup battery. If the primary power source 235 supply reaches a minimum acceptable voltage, the PDA 105 will automatically switch to backup power as well transmit a message identifying that the power source 235 is a critical level.

An instrument module 195 can be packaged separately from the PDA 105, or alternatively, an instrument module 195 can be in the same housing. The instrument module and the PDA 105 communicate through the PDA's communications link 244 and the instrument module's communications link 260. Communications links 244 and 260 are coupled through a wireless communications protocol such as Wireless USB, WiFi, Bluetooth, etc., which permit the PDA 105 and the instrument module 195 to communicate in distances of over 300 ft. The instrument module 195 can further have communications links 272, 274 and 276. These links 272, 274 and 276 permit the instrument module to connect to various devices that, for example, measure environment conditions, regulates appliances on/off state, and monitors automobile functions.

The instrument module 195 can be further equipped with a microprocessor and a memory module. The microprocessor can be configured to analyze and compute the occurrence of events, execution of operations and computer programs.

The PDA 105 can communicate with the instrument module 195 over a cellular communications network. The instrument module 195 can be installed on a cellular network and be further equipped with cellular modem that would permit the instrument module to interface with the cellular network.

Event Configuration

The PDA 105 has numerous features, functions, and capabilities described below. The PDA 105 is an intelligent device that can be configured to report, observe, and analyze numerous logical events. The PDA 105 is also configurable to give and respond to various commands, and contains a configurable history-recording component. In order to perform the desired functions, a PDA 105 is configured by loading software that executes desired operations based on the occurrence of an event. Therefore, the execution of operations is exception-based.

All configurations to the PDA 105 can be done locally or over-the-air. Thus, the user is able to configure any features including the entire operating system of the PDA over the air. This over-the-air configuration can be accomplished through use of the cellular modem 220, or any other wireless means. In one embodiment, during over-the-air or local configuration, the PDA 105 continues to operate normally. This means the PDA 105 can be configured with losing little to no operability. Over-the-air configuration commands change the parameters used for processing physical and logical events on the fly. In one approach, over-the-air operating system updates are achieved using two executable code spaces, and a temporary code space for loading new code. Once the uploading of new code into the temporary code space is completed, the PDA reboots, copies the new code into the secondary executable code space and resumes execution with the most recent update.

Figure 4:
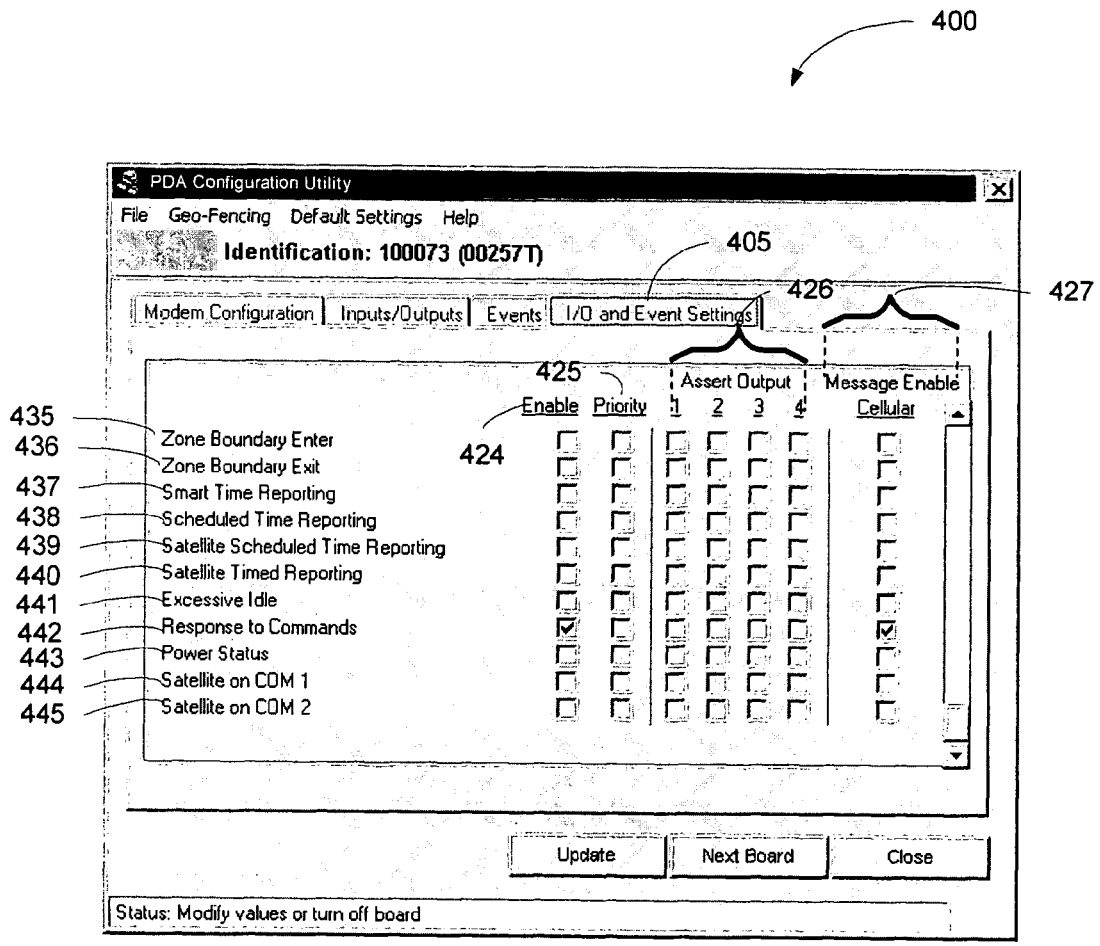
FIG. 4 illustrates a window of the PDA configuration application where the user may select parameters to configure multiple events.

FIG. 4 illustrates a window of the PDA configuration application where the user may select parameters to configure multiple events. In particular, an exemplary screen shot of the user interface for configuring the configured events on the PDA 105 is shown. The screen shot serves only as an example of a general interface which the user can interact with to configure the PDA 105. The user interface permits configuring the PDA and does not require the user to know scripts or hard-coded parameters. Instead, a software application that the user can easily interface with logical windows, tabs, fields, checkboxes and radio buttons to configure the PDA is disclosed.

The window 400 shows an exemplary list of events that can be configured on the PDA 105. The present system and method contemplate a variety of configurable logical events not depicted in the screen shot. Each event has a corresponding field box in which the user can fill in the appropriate value.

The user has the ability to configure each event 436-445 by indicating the preferences in each of the checkboxes provided. For example, the configuration of the events in the PDA 105 may entail enabling the input or feature in check boxes 424, assigning the events as a priority event in checkboxes 425, assigning one or more outputs to the events in checkboxes 426, or linking the occurrence of the events to a messaging sent via the cellular network by checking the appropriate box from a plurality of checkboxes 427. The user interface may be part of an application that resides in the configuration utility 172 (FIG. 1). Exemplary events can be configured such as Zone Boundary Enter 435, Zone Boundary Exit 436, and Smart Time reporting 437 or Scheduled Time reporting 438.

In one embodiment, events are based on rules using a combination of the GPS position of the PDA 105 and one other factor such as time or speed. In another embodiment, events are based on reaching a certain point in time that was preprogrammed in the PDA 105, or any other exception that is programmed to trigger an operation by the PDA 105. Transmitting an event message is an example of an operation triggered by the occurrence of an event and may include the transmission of a message that the event itself has occurred in combination with information such as includes latitude, longitude, speed, direction, time, health condition, home appliance measurements, environment conditions, or any other measurements that can be received from the instrument module 195.

The PDA 105 is configurable to include as few or as many logical events as the user desires. In one embodiment, an event can be to report the last known location of the PDA for a specified interval of time to the backend control system 150.

In another embodiment, the configured event is the reaching of a measurement level threshold. For example, the measurement can be of carbon monoxide, insulin any other blood content levels, heart rate, respiratory rate, room temperature, number of packages produced at an assembly line per day, etc.

The measurements can be taken periodically, by the instrument module 195, and then reported to the PDA 105. In one embodiment, the instrument module 195 transmits every measurement received from the instrument. In another embodiment, the instrument module 195 is equipped with logic that determines if the measurement taken has surpassed a predetermined threshold, and if so, the instrument module 195 transmits an event message to the PDA 105.

The instrument module 195 can also be configured to take measurements from connected instruments or devices at predetermined times. For instance, an instrument module 195 can be programmed to measure the air quality of a room every morning at 6 A.M. Then, the instrument module reports the measurement to the PDA 105, and the PDA 105 determines if an event has occurred. A configured event can be, for example, that the air quality is poor. An operation pre-programmed on the PDA 105 can include displaying a message on a display of the PDA 105 indicating that the air filters in the room must be changed.

In another example, the instrument module 195 may be configured to measure the glucose level at 9 P.M. every other night from an instrument connected to an elder person. The instrument module 195 can determine if the glucose level surpasses a threshold level of being too high or too low, and then the instrument module 195 transmits an alarm message to the PDA 105. Alternatively, every measurement is sent to the PDA 105, which only reports an alarm to the user that the preprogrammed threshold levels have been surpassed.

Yet another measurement can be the speed of a vehicle measured by a speedometer that is connected to an instrument module 195 placed in the vehicle. The PDA 105 can be configured to send reports dependent on the measured speed of the vehicle. Thus, each time the speed threshold is exceeded, the instrument module 195 detects the change immediately transmits the speed level to the PDA 105. Another measurement can be idling of an instrument such as a car engine, a computer monitor, etc. The instrument module 195 can be configured to send reports dependent on the amount of time the instrument has been idled. In addition, the PDA 105 can also be configured to send a message to the backend control system 150 with an event message of excessive idle, such that the backend control system 150 may then transmit to preloaded and configured receivers such as another PDA or a cell phone. The information relayed from the instrument module 195 to the PDA 105 can include the length time of idle.

In another embodiment, an event is reaching a time when a scheduled reporting must be performed. This feature sets the PDA 105 with a reporting feature on an interval based upon a date and time reference. Thus, the user can configure the PDA 105 to report any parameters or data on pre-selected days and hours of the week. For example, a user could use the scheduled reporting feature to configure the PDA 105 to only report at 8 AM, 12 PM and 4 PM on weekdays and only once per weekend day. Thus, even when the PDA 105 has received multiple messages from the instrument module 195, the PDA 105 will only report the events during the times specified by the user.

In another embodiment, the configured event is the turning on, or turning off of an instrument. For example, as the air conditioning unit turns on automatically, the instrument module 195 may be configured to detect that the air conditioning unit has turned on. The instrument module 195 then sends a message to the PDA 105 indicating that the AC has turned on. The PDA 105 may be further configured to immediately query the room temperature from the instrument module 195 which in turn measures the temperature utilizing a thermometer connected to the instrument module 195. The instrument module 195 transmits a signal to the PDA 140 with the current room temperature, and then the PDA 140 calculates whether an alarm should be generated. If the air conditioning unit turned on and the temperature does not warrant the turning on of the air conditioning unit, then the PDA may display an alert message on its display and send an event message to the backend control system 150. The instrument module 195 may receive turn on and turn off signals from various instruments and peripheral devices such as kitchen and home appliances, lights in a room, pool systems, heating units, to name a few.

In yet another embodiment, the configured event can be the receipt or sending of a message at a communications device. Communication devices include a facsimile machine, a computer system connected to the Internet, telephone, etc.

While the event configuration discussed above is applied primarily to the PDA 105, the logic to detect the occurrence of an event, and the logic to execute a specific operation because of the occurrence of the event can be implemented at the instrument module 195. Therefore, the event configuration may be solely implemented on the PDA 105, solely implemented on the instrument module 195, or implemented as a combination in both the instrument module 195 and the PDA 105.

Geofencing

Various events can be configured based on "geofencing" events. Geofencing entails creating configurable boundaries or geographical zones in which a PDA 105 operates and relates to the instrument module 195. Furthermore, the entering or leaving a geographical area that has been geofenced can be an event itself, and can be programmed in the PDA 105. In another embodiment, once a zone is entered by the PDA 105, the PDA 105 can switch communication modes and adapt to the new zone such that the PDA 105 interacts only with the peripheral devices within the entered zone. Furthermore, the PDA 105 can adapt to the new zone by loading a specific configuration for that zone such that it interacts with zone-specific instruments through the instrument module 195 that operates in that zone.

A configurable boundary or geographical zone may be constructed through a combination of waypoints and/or zones. Because of this combination, the configurable boundary or geographical zone can be constructed in a very specific shape and outline specific borders or routes. A waypoint is a circular area defined by a geographical center point and radius. The area defined by the waypoint is configurable by changing the radius and the position of the geographical center point. Thus, the boundary created by the waypoints and zones is configurable.

In one embodiment, the PDA 105 is loaded with a plurality of waypoints, each waypoint defined by a coordinate and a radius. A zone can be defined by a plurality of waypoints. Thus, for example, a city can be defined by two waypoints. Using GPS data, the PDA 105 will calculate whether it is in any of the two waypoints defining the city. If the PDA 105 determines that it is inside one of the two waypoints, then the PDA 105 assumes that it is within the limits of the city. A greater number of waypoints will increase the resolution of how the zone is defined. Thus if two waypoints are used, the resolution can be increased by adding ten extra waypoints that further define the delineation of the city boundary.

A zone can be an irregular region defined by a series of line segments enclosing an area. In one embodiment, each zone contains 3 to 256 or more deflection points for creating the line segments defining this irregular area. In one embodiment, this irregular area can create a configurable boundary or a geographical zone. The properties of a zone include a name, description and a flag determining if the zone is an off-limits zone or an enclosed zone.

In one embodiment, a geographical zone can be created selecting a plurality of coordinates and downloading the coordinates to the PDA 105. The plurality of coordinates may be in the Mercator system. Next, the PDA 105 assigns each coordinate to a pixel in a pixilated image that is loaded in the PDA 105. In order to perform the assignment, the PDA 105 utilizes logic to define a "bounding" square or box around the plurality of coordinates. Then the bounding box is pixilated and the pixels where the coordinates fall are marked as activated. Once the pixels for each coordinate are assigned, lines are extended from one pixel to the next so as to form an enclosed area in the pixilated image. The pixels the lie in the path of the lines between the activated pixels are also activated. Thus an enclosed and contiguous line of pixels is formed. Greater Waypoints and zones are built by the operations data processor 173. Once a waypoint has been built, it can be used in PDA loads. In one embodiment, a PDA load is a collection of zones and waypoints slated to be loaded on a PDA 105. These loads are loaded on to the PDAs with the configuration utility 172.

Figure 5A:
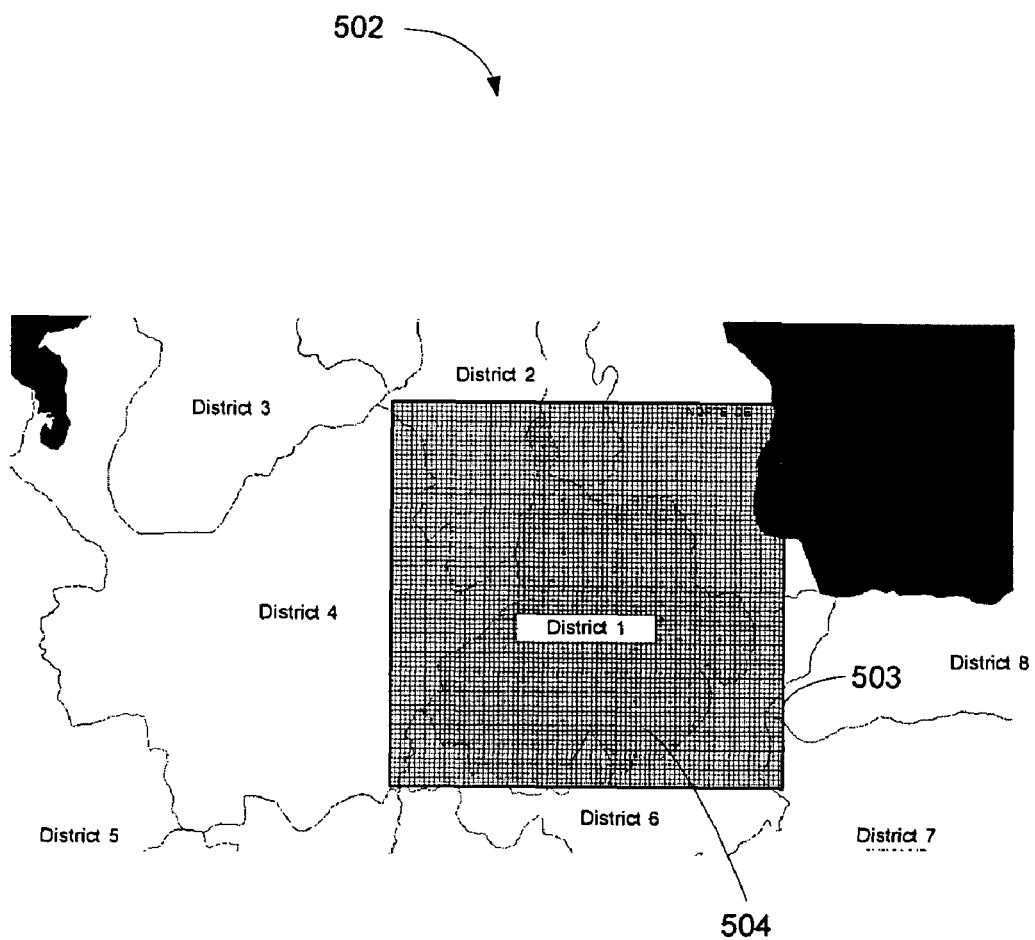
FIG. 5A illustrates a map of a geographical zone divided into a grid.

FIG. 5A illustrates a map of a geographical zone divided into a grid. A pixel map 502 is first presented to the user as a geographical map on a screen connected to a computing device. In one embodiment, the computing device is the operation data processor 173 (FIG. 1), and the user is a systems operator that inputs general geographical zones (e.g. city limits) that can be selectable by any user having a PDA 105. In another embodiment, the computing device is a home computer and the user is the PDA 105 user who configures the different geographical zones on his computer. The home computer connects to the configuration utility through a direct secure connection via an application installed on the home computer. Alternatively, the home computer can be connected through the Internet using a web browser.

The computer application or interface allows the user to customize the boundaries by interacting with a map and visualize the created zones or boundaries. The configuration application displays a map on which the user selects a rectangular shape 503 around the geographical area 504 that the user desires to define. In another embodiment, the user may define a customized shape. The rectangular shape is then divided into smaller rectangles such that the area of the rectangle is divided into a grid. Each pixel in the grid can be activated to be part of the geographical zone.

In one embodiment, the user may activate each pixel by double-clicking on each pixel. In another embodiment, the user may select a smaller rectangular region and mark the smaller rectangular region as being part of the geographical zone 504 so that the pixels contained in the smaller geographical zone are activated. In yet another embodiment, the user may select a circular area as being part of the geographical zone 504, and all pixels in such circular area would be activated. In another embodiment, the user may define any customized geometrical or non-geometrical shape.

The user can also select the resolution of the area definition. In other words, when the selected area is subdivided into a grid of rectangles, the grid includes a much higher number of vertical and horizontal lines, thus increasing the number of grid rectangles obtained from the subdivision. The increase in number or rectangles increases the resolution because each rectangle covers less geographical area. A user who desires to have great detail in defining the area may reduce the size of the grid rectangles and thus increase resolution of the area.

An increased resolution of the area can allow a user, for example, to define a the geographical area of a house, where the geographical area covered is much smaller than that for a state. The perimeter around the geographical area of the house can have details that can only be identified by very high resolution. On the other hand, a user who is concerned with roughly knowing that a state has been entered does not need great resolution of the state area. Therefore, the resolution necessitated to define the area of a state can be configured to be low.

Each selected rectangles is then mapped to a pixel. Thus, once all the desired pixels are selected by the user as being part of the geographical zone 504, the rectangular shape 503 is mapped into a pixilated computer image. In one embodiment, the pixilated computer image contains the same number of pixels as the number of sections in the grid. The pixilated computer image can then be loaded to the PDA 105. The PDA 105 can be programmed to determine the position of the entity with a simple calculation of whether the pixel in which the PDA's location falls is activated or deactivated. In another embodiment, the geographical zone is defined by selecting a rectangular region and a circular region. The circular region can be defined by a waypoint.

An irregular zone or geographical zone may be defined by a collection of waypoints and pixilated images. Furthermore, each irregular zone may have additional parameters such as speed threshold of the entity, flagged as a "no-fly zone," color coded in order of danger or security threat, communication enabled or disabled, etc.

When the PDA 105 enters or exits waypoints and zones, an event message can be transmitted indicating what reference point or zone has been entered or exited. The event message can include latitude, longitude, speed, direction, time, state of the inputs, odometer, event reason or source, and any other relevant information. Thus, the zone boundaries and waypoints allow the user to enter multiple zones and interact with instruments of that zone. In addition, the zones and boundaries allow a user having a PDA 105 to receive information of the location of another user wearing a second PDA. Therefore, a PDA user can have the capability to monitor the location of another PDA user that travels through configurable boundaries or geographical zones such as state borders or a specified route.

In one embodiment, the waypoint and zone events are configurable to take one or more actions. For example, upon entering a zone, the PDA 105 may be configured to indicate the name of the new zone by either displaying on an integrated screen or by emiting a sound or prerecording with the name of the song. In addition, another operation can be carried out because of the event of entering the zone. For example, the PDA 105 can be configured to compute whether the entered zone is a new time zone, and if so, indicate the new time zone and the current time.

Figure 5B:
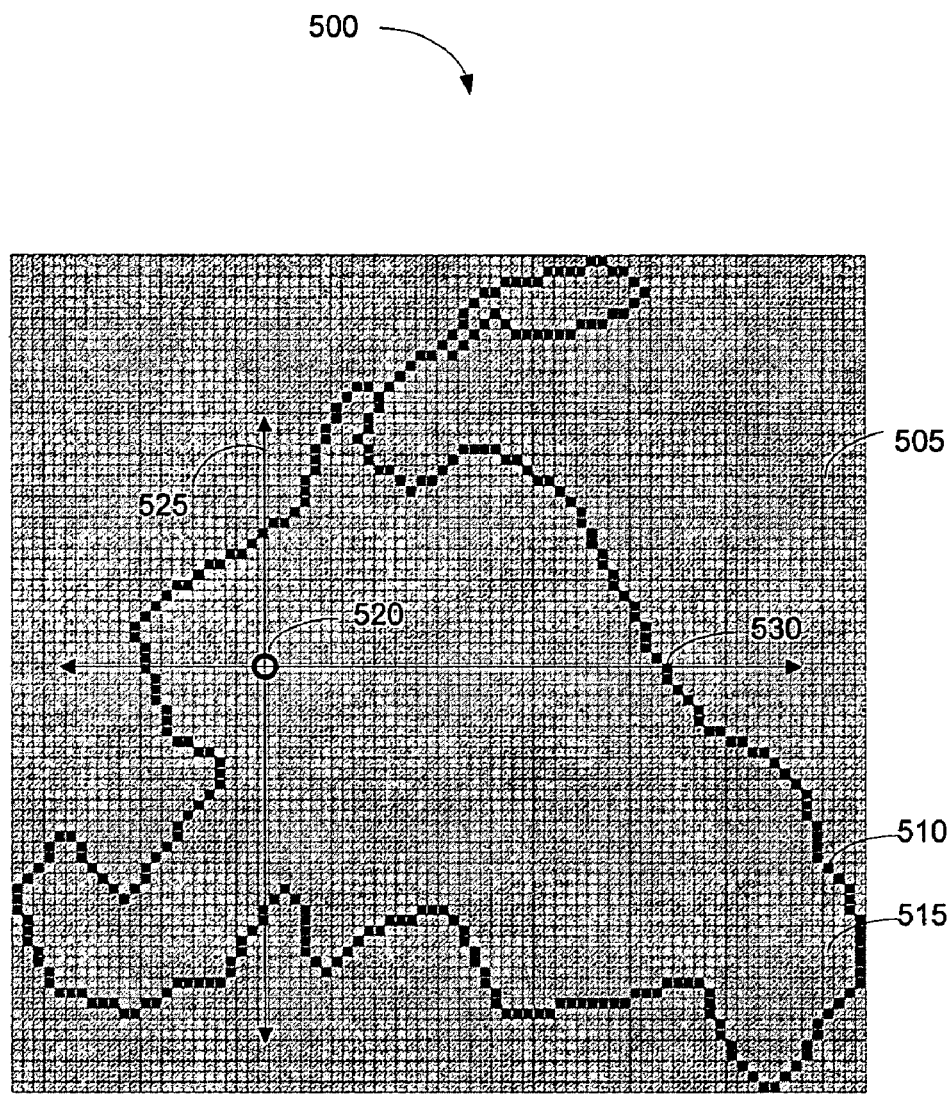
FIG. 5B illustrates a pixilated image representing a geographical zone.

FIG. 5B illustrates a pixilated image 500 representing a geographical zone. In one embodiment, after all the deflection points for a given zone are uploaded, the zone is saved in the memory module 280 of the PDA 105 in the form of a pixel map 500. The pixel map 500 is created by first drawing a square around the entire area of the zone. The square is then divided into an 80/80-pixel map. Each pixel 505 is a square. These squares are then used to draw the outline shape 510 of the zone 515. A geographical area is then mapped to each pixel 505 of the pixel map 500.

In another embodiment, if the pixilated image is created in the configuring computer, the image is simply loaded onto the PDA 105, and the PDA 105 does not need to build or construct the image by itself.

A position fix 520 in the pixel map 500 is mapped from the current geographical location of the PDA 105. A test can be performed to for each zone for each position fix 520 in order to determine if the PDA 105 is inside the zone 515 or outside the zone 515. Thus, for each zone 515, the test starts with a simple check if the position fix 520 is inside or outside the pixel map 500. If the current position fix 520 is inside the pixel map 500, a more extensive test is completed by plotting the position fix 520 inside the bounding box and drawing four lines in four directions (north, south, east and west) from the position fix 520 to the borders of the pixel map 500. Subsequently, the number of zone boundary crossings 530 is counted for each of the four lines 525.

Multiple boundary crossing tests are performed for accuracy. If a given line 525 crosses an odd number of zone boundaries 510, the position fix 520 is considered inside the zone 515. If a given line 525 crosses an even number of zone boundaries, the position fix 520 is considered outside the zone 515. If at least three out of the four boundary crossing tests agree, the zone boundary crossings 530 are used to determine if the position fix 520 is inside or outside the zone. If three out of the four boundary tests do not agree, the position fix 520 is considered outside the zone 515.

Position fixes 520 that are on the special locations in the pixel map 500 can yield specific location results. In one embodiment, position fixes 520 that land on a zone boundary 510 are determined to be outside the zone boundary 510. In another embodiment, position fixes 520 that land on a zone boundary 510 are determined to be inside the zone boundary 510. In one embodiment, position fixes 520 that land on a "long and narrow protrusion" which is only one pixel wide can be considered to always be inside the zone 515. In another embodiment, position fixes 520 that land on a "long and narrow protrusion" which is only one pixel wide can be considered to always be outside the zone 515.

Commands to the PDA

The PDA 105 is also configurable to respond to various queries and set commands sent over the air. The position query commands the PDA 105 to return the last valid GPS position, speed, and direction of travel, time, and any other data received from the instrument module 195 or populated by calculation of the PDA 105. The PDA 105 is also configurable to respond to various query commands sent over the satellite modem.

Upon receiving a query command, the PDA 105 returns the state of its data, connecting instruments and last measurements and status signals from the connecting instruments. Examples of other forms of query commands that are sent to the PDA 105 are Input from the Instrument Module, Output to the Instrument Module, Measurements received, GPS information, Firmware Version Query, Satellite Status Query, etc.

Another optional command is the alarm acknowledgement. This command is sent to the PDA 105 to terminate the sending of a priority event (panic, medical or roadside assistance are examples of priority events). When the alarm acknowledgement is received, no further priority messages for the current event are transmitted.

In another embodiment, the command may be to send a text message, from the PDA 105 through the communication network to a device configured to receive and interpret text messages, such as a pager, a cellular phone or another wireless device.

In an effort to combat GPS drift, two parameters are included to filter GPS positions received from the GPS receiver. The two filters are based upon maximum allowed speed and maximum allowed acceleration. The parameters can be customized to the type of installation. If a packet is received from the GPS receiver and either of these two parameters is exceeded, the position packet is thrown out.

Commands to the Instrument Module

Much like the PDA 105, the instrument module 195 is also configurable to respond to various queries and set commands sent over the air or through the Internet. Most commands received by the instrument module 195 can originate from the PDA 105.

In another embodiment, a command is a configuration command to configure functionalities of the instrument module 195 as previously discussed. Examples of configuration commands include Configure Timed Reporting, Upload New Firmware, Set Excess/Highest Threshold level of a substance in a blood sample, Enable Short-Range Radio Communication, Configure Excessive Idle Event, Set Critical Power Level, Configure Smart Timed Reporting, Configure Scheduled Reporting, Query instrument status, Query instrument measurement, Turn on instrument, Turn off instrument, etc.

The instrument module 195 may include a history-reporting component. Whenever the instrument module 195 cannot transmit data packets due to a lack of coverage via the principle communication links, the packers are stored in one of at least two history logs on on-board flash memory storage device. When the instrument module 195 determines that the PDA 105 is within the range of transmission, or if the PDA 105 queries the instrument module 195, then the instrument module 195 determines that the communication link has been re-established, any packets stored in memory are sequentially transmitted, beginning with those messages identified as a priority. For example, an emergency from a measurement from an instrument 140 would be a priority message which would be the first message transmitted when the connection is re-established.

The instrument module 195 may also receive commands from the backend control system 150 through the Internet. These messages would be commands requesting specific information such as production rate in a fabric where the instrument module 195 is connected to the packaging machines. In yet another embodiment, the instrument module 195 can be configured to connect to the Internet and report a measurement to the backend control system 150 in case of an extreme urgency. For example, if the instrument module 195 receives a measurement from a instrument or device indicating that there is high levels of smoke in the room, the instrument module 195 may utilize an internet connection or any other networking connection such as a direct gateway in order to connect to the backend control system 150. The backend control system would in turn receive the event message and relay the message to the PDA 105.

Backend Control System

The backend control system allows the system to be more comprehensive and have large-scale connectivity with other computing systems. The backend control system is not, however, necessary for the implementation of the monitoring and controlling of instruments or peripherals within an environment. This is because all of the monitoring and controlling functionality can reside in the PDA 105.

Figure 6:
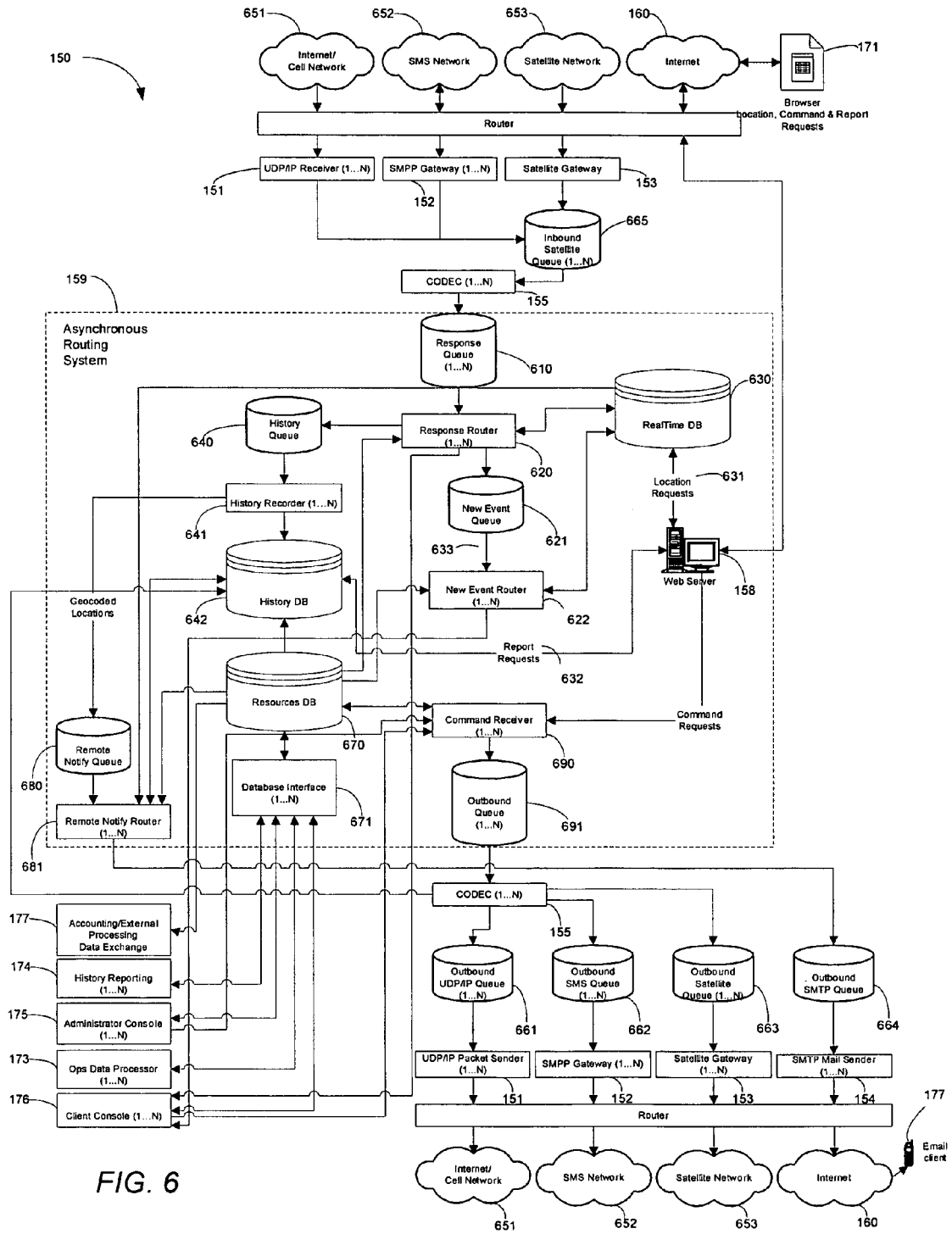
FIG. 6 illustrates a component diagram of a backend control system.

FIG. 6 illustrates a component diagram of a backend control system 150. This includes a plurality of gateway systems 151-153, a codec 155, and an asynchronous routing system 159. In turn, the asynchronous routing system 159, includes a web server 156, a plurality of router systems 620, 622, a real time database 630, a history database 642, and a resources database 670.

In one embodiment, the real time database 630 can maintain records of the most recent information from a PDA 105 such as location, speed, direction, associated instruments, associated geographical zones, etc. The history database 642 maintains records of all events and transactions that were received and sent from the asynchronous routing system 159. Finally, the resources database 670 keeps records of all the instrument modules that are part of the system.

The backend control system 150 can be configured to run on any combination of computer servers. In one embodiment, the plurality of communication gateway systems 151-153 runs on independent computer systems. In another embodiment, the communication gateways 151-153 run on a common computer system.

The communications gateway systems 151-153 direct data flow from each of the PDAs 105 into the backend control system 150. The gateway systems 151-153 also direct commands and queries to the appropriate PDA 105. Each gateway establishes and maintains a communication link with a communications network 651-653. In one embodiment, the gateway is a Universal Datagram Protocol/Internet Protocol (UDP/IP) packet receiver and sender 151 which connects to an internet/cellular network 651. There may be more than one UDP/IP gateway 151 transmitting and receiving data. The UDP/IP gateway 151 allows the backend control system 150 to communicate with PDAs 105 over GSM/GPRS, CDMA/1xRTT and CDPD networks using UDP packets.

In another embodiment, the gateway system is a Short Message Peer to Peer (SMPP) gateway 152 that connects with a Short Message Service (SMS) network 652. A plurality of SMPP gateway systems 152 transmit and receive data for PDAs that communicate over SMS networks using an SMPP protocol. Each SMPP gateway system 152 opens and maintains a continuous connection to the service provider's Short Message Service Center (SMSC) for incoming data so that reception of PDA 105 data from the SMSC can be guaranteed.

In another embodiment, the gateway system is a satellite gateway 153 that connects to a satellite network 653. As illustrated in FIG. 1A, the satellite network 653 may include one or more satellites 130 and, at least on ground station 145. The satellite gateway 153 transmits and receives data for PDAs 105 that communicate through satellite communication. In one embodiment, the satellite communication protocol may be that of Inmarsat satellites using eight-byte packets of data. The satellite gateway 153 gateway opens and maintains a continuous connection to the satellite network 653.

The communication between the asynchronous routing system and PDAs 105 are channeled through an appropriate gateway system 151-154. An appropriate gateway system 151-154 is selected based on a unique combination of PDA manufacturer, communications protocol and service provider. For example, a PDA 105 that uses CDPD communication would be routed through a different gateway system 151-154 than a PDA 105 that uses SMS communications protocol. Likewise, PDAs 105 that use the same communication protocol such as CDPD, but have a different service provider would have separate gateways.

As the gateway system 151-153 receives each inbound packet of data, the gateway system 151-153 tags each packet with the date and time of arrival, the PDA 105 manufacturer information, the PDA's 105 address information, and repackages the packet for transmission to the codec 155. The gateway 151-153 then writes the repackaged data into a queue 665 that is read by a codec 155.

When the gateway system 151-153 receives an outbound packet from an outbound queue 661-664, the gateway system 151-153 uses the address information to send the packet to the target PDA 105. If required, the gateway system 151-153 verifies before transmission that the gateway system 151-153 has an open and valid connection to the corresponding network 651-653. Each gateway system 151-153 has at least one corresponding outbound queue 661-663. For example, each UDP/IP gateway 151 has at least one outbound UDP/IP queue 661. Each SMPP gateway 152 has at least on outbound SMS queue 662. Each satellite gateway 153 has at least one outbound satellite 663. Each SMTP mail gateway 154 has at least one outbound SMTP queue 664.

After a packet is placed in the inbound queue 665, the data coming from various networks is decoded into a standard data format. Likewise, before a packet is placed in an outbound queue 661-664, the data going to different communications networks is coded from the standard data format, into a network specific format. The coding and decoding of data is carried out by the codec (coder-decoder) 155. The codec 155 permits the greater flexibility because the introduction of new communication network protocols is transparent to the asynchronous routing system 159. Thus, if a new PDA model uses a new communication network protocol, the backend control system does not need to be upgraded. The system upgrades needed would be a codec 155 update and a new gateway if necessary.

When a packet comes into the asynchronous routing system 159, each inbound packet that the codec 155 receives is first examined to determine the PDA model. If the codec 155 supports the specified PDA model, the data is translated from the PDA 105 proprietary format into the standard system format. Once the codec 155 has interpreted the data, the codec 155 then writes the data into a response queue 610. If the codec 155 does not recognize the PDA model, the codec 155 then logs the unsupported data and emails the data to a designated system or network technician.

When a packet is sent from the asynchronous routing system 159, the codec 155 determines the PDA model to which the packet is sent. If the codec 155 supports the specified PDA model, the data is translated from the standard system format into the PDA 105 proprietary format. Likewise, if the packet is sent to another device that is not a PDA 105, the codec determines if it supports that device, and if so, translates to the appropriate format. Once the codec 155 has interpreted and encoded the data, the codec 155 then places the packet into the queue that corresponds to the appropriate type of network communication protocol. An SMS packet data would be placed into the outbound SMS queue 662. If the codec 155 does not support the PDA 105 model, the codec 155 then logs the unsupported data and emails the data to a designated system or network technician.

Once a packet is processed by the codec 155, it then is processed depending if it is an outbound or inbound packet. Outbound packets are placed in the appropriate outbound queue 661-664. Inbound packets are received by the asynchronous routing system 159 in a response queue 610. The response queue 610 feeds the packets to the response router 620. The response router 620 determines if a client console 176 is tracking the PDA 105 or the instrument module 195 associated with the incoming message. If so, the response router 620 routes the incoming message to the appropriate client console 176. Thus, the client console 176 receives the message before any other process in the asynchronous routing system 159. If no client console 176 is tracking the PDA 105 or the instrument module 195 associated with the incoming message, the response router 620 places the incoming message into a new event queue 621. The new event queue 620 feeds a new event router 622. The new event router 622 analyzes each incoming message and determines if the incoming message is associated to a new priority event for the PDA 105. The new event router 622 determines if the incoming message is associated to a new event by searching a real time database 630 for a similar event associated to the PDA 105 or an the instrument module 195. If no event is recorded for the PDA 105, or the event is of high priority, the new event router 622 sends a routing request to all client consoles 176 that have permission to view the incoming message. The request is intermittently sent until at least one client console 176 accepts the routing request. Once the routing request is accepted, the client console 176 adds the PDA 105 to an inventory in the client console 176 so that the incoming message can be handled.

Asynchronously, a history queue 640 receives the inbound and outbound messages for all PDAs 105 and all of the messages from the instrument module 195. The inbound messages are fed from the history queue 640 to the history recorder 641. The history recorder 641 geocodes all packets that have a valid latitude and longitude. The geocoded information is saved in a history database 641 to be used later for reporting and statistical analysis. Furthermore, the history recorder 641 timestamps all the incoming messages and tags them as being from either the PDA 105 or the instrument module 195.

In one approach, incoming messages from PDAs 105 or an instrument module 195 may also be forwarded to an email address, or cellular telephone, or any other communications device. To achieve this functionality, the history recorder 641 also transmits the geocoded locations and event message information to remote notify routers 681 by placing the geocoded locations in a remote notify queue 680. The remote notify router 681 that receives the geocoded location and event information queries the resources database 670 to find out if the configuration information or event information received requires a notification to a PDA 105, the instrument module 195 or communications device 177. If a notification is required, the remote notify router 681 retrieves the contact information for the appropriate PDA 105, the instrument module 195 or the communications device 177. The remote notify router 681 then formats and encodes the message sent to the PDA 105, the instrument module 195 or the communications device 177. The message is placed in the outbound SMTP queue 664 to be sent through the SMTP gateway 154. The message can be placed in the outbound SMS queue 662 to be sent through the SMPP gateway 152.

The real time database 630 is also updated with the new event information associated with the incoming message. Thus, the real time database 630 contains the latest information reported on a given PDA 105. The real time database 630 is connected to a web server 158. The web server 158 is directly connected to the internet 160 and allows users of a web tracking application 171 to make location requests, command requests 632 and report requests 633. When a web server 158 receives a location request 631 from the web tracking application 171, the web server 158 queries the history database 642. The history database 642 contains all events in a chronological order. The web server 158 retrieves all transactions related to the web tracking application 171 query and forwards the data to the web tracking application 171 for displaying in a web browser.

When a web server 158 receives a location request 631 from the web tracking application 171, the web server 158 queries the real time database 630 for the corresponding PDA 105 information. The real time database 630 provides PDA information as related to the very last incoming message from the incumbent PDA 105. The web tracking application 171 may also send a command request 632 such as querying the position of the PDA 105. The command request 632 is sent to the command receiver 690 which in turn process the position request command by tagging the appropriate PDA 105 information. The message is encoded by the codec 155, placed in the appropriate outbound queue 661-663 and sent through the corresponding gateway system 151-154 to the PDA 105. The PDA 105 will then send back a response, and the backend control system 150 then processes it updating the real time database 630. After the real time database 630 has been updated, the web server 631 may refresh the contents of the web tracking application 171 showing the new position of the PDA 105.

In another embodiment, the web tracking application 171 can monitor the location of an instrumentation module 140. The real time database 630 may be connected to the resources database 670 to query the position of the instrumentation module. In another embodiment, the position information is the instrument module 195 is only located in the resources database 670 because it is assumed that the position of the instrumentation module is static. Then, the web tracking application 171 connects directly to the resources database 670 and queries the position of the instrument module 195 which can be treated as a constant attribute of each instrument module 195.

The command receiver 690 processes all commands pertaining to all outbound messages to be sent to PDAs and to instrument modules. The command receiver may receive command messages from the client consoles 176, the administrator consoles 175, or from the web server 158. When the command receiver 690 receives a command message, the command receiver 690 tags each outbound message with the correct PDA 105 address. Likewise, the command receiver 690 may tag the message with the correct instrument module 195 address by searching the resources database 670 and retrieving the address information. Each message is sent by the command receiver 690 to the codec 155 for encoding.

In one embodiment, all of the commands that are processed by the command receiver 690 are ultimately sent remotely to the PDA 105 or to the instrument module 195. An exemplary command is a Position Query. Upon receiving this query command, the PDA 105 returns the last valid position, speed, direction, time and input state.

In another embodiment, the command is directed to a PDA 105 or to the instrument module 195 to request a Measurement Query. Upon receiving this query command, the PDA 105 or the instrument module 195 can return the last updated measurement of a specific instrument or connected device. In another embodiment, the Measurement Query command triggers the instrument module 195 to take another measurement and relay it back to the backend control system 150. In one approach, for any given measurement, the response can be "High," "Low," or any given In another embodiment, the command is an Alarm Acknowledgment. This command can be sent to the PDA 105 or to the instrument module 195 to indicate the PDA 105 or the instrument module 195 that an emergency signal has been received and acknowledged. The emergency signal can be related any event panic, roadside assistance, or medical assistance. When the alarm acknowledgement is received, no further emergency messages for the current event are transmitted from the PDA 105 or the instrument module 195. Other exemplary commands sent to the PDA 105 or to the instrument module 195 are setting the reporting time interval, setting the IP address, and uploading new firmware.

The asynchronous routing system 159 interacts with various control consoles. Reporting consoles 174 connect to the resources database 670 to display instrument module information. Administrator consoles 175 also can connect to the resources database 670 to retrieve instrument module 195, PDA 105, and user information. Administrator consoles 175 also connect to the command receiver 691 to send commands to the PDA 105. Operations data processors 173 connect to the resources database 670 in order to retrieve configuration information for a specific user, PDA 105, or instrument module 195. Finally, the client console 176 can also receive information for a PDA 105 from the response router 620 or from a new event router 621, and then retrieves information associated to the PDA 105 or the instrument module 195 from the resources database 670. The client console also transmits command to a PDA 105 by sending the command to the command receiver 691.

Logical Hierarchy

Figure 7:
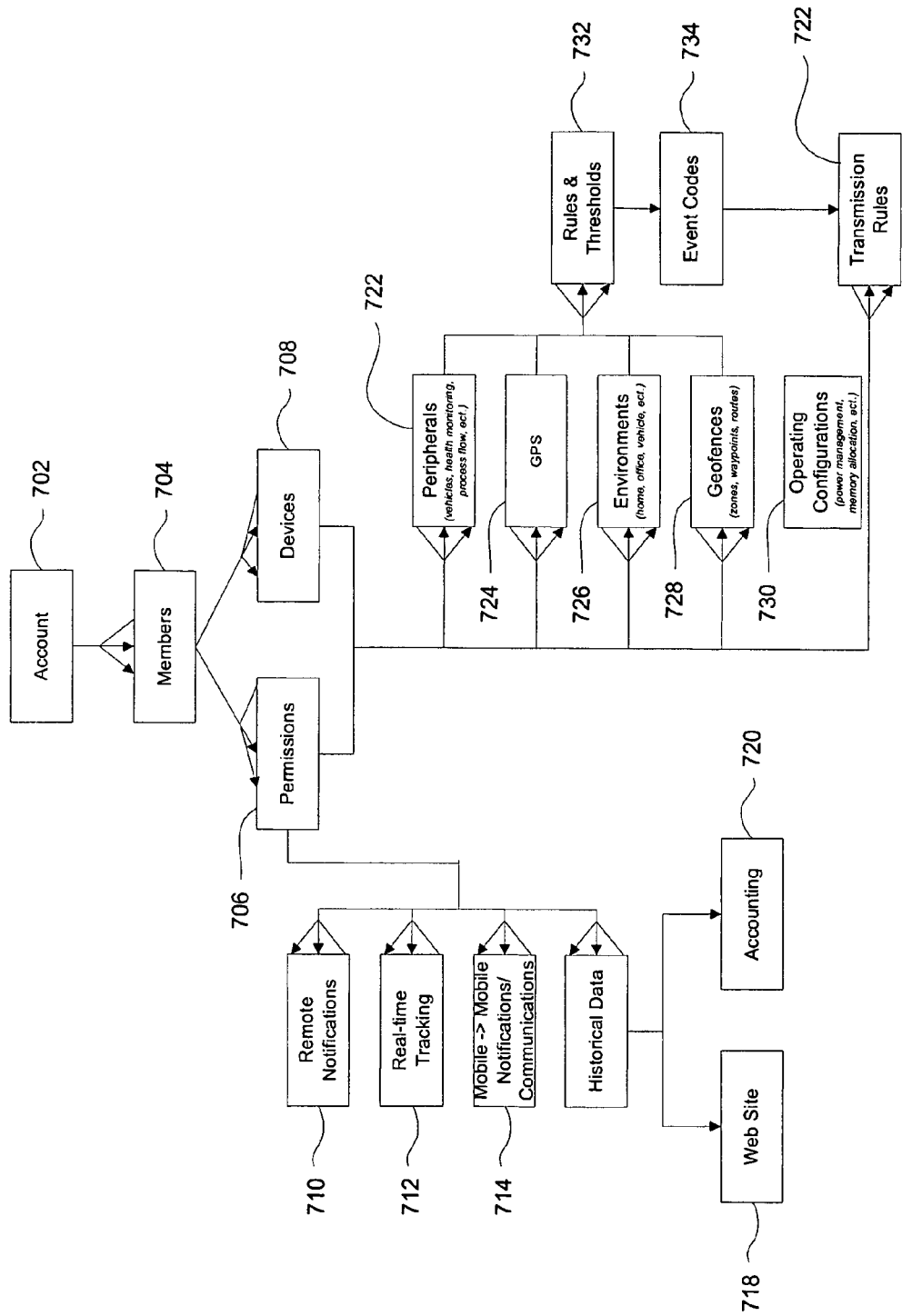
FIG. 7 illustrates a logical component hierarchy of the system.

FIG. 7 illustrates a logical component hierarchy of the system. The logical component hierarchy illustrates the relation among different logical components and their functionality in relation to each other. For example, a logical component block 702 represents an account related to a member. A member is represented by logical component block 704. The account can be established with the backend control system 150, or with a host of a portal that allows integration of all logical components in a single database. The host to the portal can, in one approach, reside in a server computer. In another embodiment, the host of the portal can be the instrument module 195.

The relation between logical component block 702 and logical component block 704 is a many to many relation. Thus, an account can be related to multiple members, such that members belonging to an account can access information and maintain configurations pertaining to that account. In another embodiment, a member can have multiple accounts. A member may subscribe different accounts if he utilizes, for example, two PDAs and has an account for each PDA 105.

Member access to an account is controlled by permissions. Each member has assigned permissions. Logical component block 706 shows the relation between members and the assigned permissions. Members with administrator privileges can grant other members privileges. The owner of a PDA 105 can be assigned with administrator privileges. The owner can grant a doctor permission to interface with a health monitor that is connected to the owner's PDA 105. In another example, the owner can grant permission to an insurance company to view the driving habits of the owner of the PDA 105 by monitoring the PDA 105.

Permissions permit a member to access configuration capabilities to a device, as well as information received from the devices within an account. For example, logical component block 710 corresponds to remote notifications which can be received by a member having permissions to receive such notification. Alternatively, a member having the correct permissions can configure the sending and receiving of remote notifications. The notifications are received by the PDA 105 or another wireless device. In one approach, the notification relates to the occurrence of an event. The notification can be an email, SMS message, an instant message, a voice message, a network popup, and alphanumeric page, etc.

Logical component block 712 corresponds to real time tracking functionality. If the member has the correct permissions, the member can track and monitors assets, receive process flow updates, update delivery schedules on his PDA 105. Likewise, in logical component block 714, a member with correct permissions can monitor assets and manage communication with other member utilizing a PDA 105. Finally, permissions of logical component block 712 can permit a user to access historical data as shown in logical component block 716. Exemplary historical data is accounting data show in logical component block 720. Only members with the right permissions have detailed accounting data that corresponds to inbound and outbound traffic as well as which devices generated the traffic. A web server with previously granted permission, as shown in logical component block 718, may also access the historical data.

Logical component block 720 corresponds to devices that belong to a given member. Although those devices will most commonly be PDA 105 devices, the portal is not limited to the support of PDA 105 devices. The configuration of devices is entered in the backend control system 150 or any other portal host and then downloaded to the devices either serially or wirelessly. Devices are configured to interface with and collect information from an unlimited number of internal and external data sources. These interfaces can be wired directly to the PDA 105, or transmit data wirelessly via Bluetooth or cellular transmissions.

PDA 105 devices are designed to be event driven, transmitting data only when exceptions are met. This approach limits the amount of data sent over-the-air and preserves bandwidth. This is accomplished using rules and thresholds that can be configured for any combination of internal and external data sources. When a rule is broken or threshold exceeded, a customer-defined event can be generated. The transmissions of these events are controlled by the transmission rules and operating configuration of the device.

Events are configured in relation to interaction with other devices such as peripherals corresponding to logical component block 722, GPS devices corresponding to logical component block 724, environments corresponding to logical component block 726, geofences corresponding to logical component block 728, and operating configurations corresponding to logical component block 730.

Peripheral devices can include any external monitoring device such as a measurement instrument that can pass information to the host device, such as the instrument module 195. Peripheral devices include health monitoring devices, environment condition sensors, process flow systems, vehicles and devices on a vehicle, etc.

Multiple Environments

Environments associated with the devices can be a home environment, an office environment, a vehicle, a restaurant, etc. Geofences can be built and configured to delineate the perimeter of any environment or geopolitical subdivision such as a city, county, district, etc. Geofences can be waypoints, zones, routes, or a collection of waypoints, a collection of zones, a collection of routes, or any combination thereof.

Figure 8:
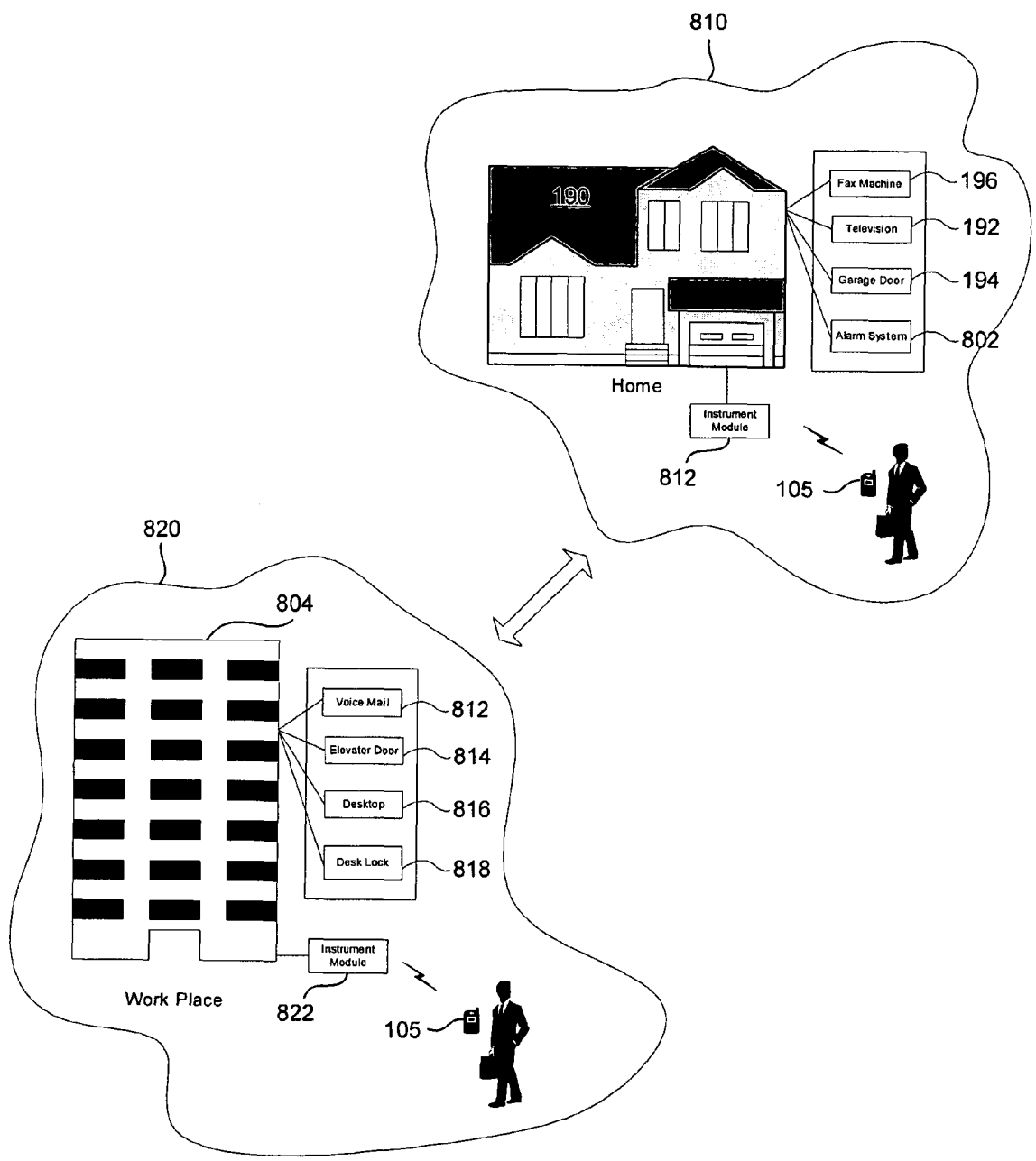
FIG. 8 illustrates multiple environments in which the PDA may operate.

FIG. 8 illustrates multiple environments in which a PDA may operate. In one embodiment, an individual may own a PDA 105 and configure it to recognize his home environment 190 and his work environment 804. The user can select boundaries that define the environments in which he or she wants to operate and have control. The home environment 190 can be defined by a geographical zone 810, while the work environment can be defined by an geographical zone 820. As mentioned above, the geographical zones can be configured the delineating irregular boundaries and storing them in the PDA 105.

In one embodiment, the PDA 105 utilizes GPS information in combination with the pre-stored geographical zones 810 and 820 to determine if it is within the home environment 190 or the work environment 804. Therefore, the PDA 105 does not need to signal the instrument module 195 or any other device in each environment to establish the PDAs 105 presence. Rather, the PDA 105 calculates its position based on the GPS data and "knows" whether it is in a new location. The data obtained from the PDA's 105 GPS receiver 215 is utilized geocode the position of the PDA 105. The position of the PDA 105 can be geocoded periodically and then calculated to be within the geographical zone. Each geographical zone has associated coordinate data which is compared with the data obtained from the GPS receiver 215 to determine whether the PDA 105 is in the geographical zone.

As the PDA 105 moves from one location to another (e.g. from a home environment to a vehicle environment), the portable device recognizes the new location and switches to an operation mode pertinent to that location. For example, if the portable device leaves the premises of the home environment 190, and enters the premises of a vehicle, the PDA 105 will cease from interacting with home appliances and start interacting with vehicle parts. In effect, the portable device would have a location-specific behavior.

Thus, if the PDA 105 determines that it is either within geographical zone 810, then the PDA 105 loads the configuration that corresponds to the home environment 190. Namely, as soon as the determination is made that the PDA 105 in the home environment 190, the PDA 105 assumes that communication with the instrument module 812 is possible and starts sending and receiving information from the fax machine 196, the television unit 192 and garage door opener 194 and the alarm system 802.

The PDA 105 may be configured to communicate with the garage door opener 194 or any other locking device in the garage door at home, such that as the individual carrying the PDA 105 enters geographical area 810, the garage door unlocks and opens. Similarly, the PDA 105 may communicate with the alarm system 802 to indicate that it can be disabled, and with the television unit 192 to turn it on. If the fax machine 196 was turned off, as soon as the individual enters the geographical are 810, the PDA 105 may send a signal to the instrument module 812 commanding that the fax machine 196 be turned on. In another embodiment, if the instrument module 812 is connected to a carbon monoxide detector, and the levels of carbon monoxide are high, the instrument module 812 can communicate with the individual as he is entering the geographical area 812 and warning of the danger.

In another embodiment, where a family of with multiple members (e.g. father, mother, son, and daughter) each have a PDA 105, the configuration of each PDA 105 can be different. For example, each PDA 105 can be configured with multiple geographical zones corresponding to user-specific locations such as home and school for the son, and home, school and neighborhood for the daughter. The daughter's PDA 105 could include the geographical area for an unsafe neighborhood and event alarms indicating that the unsafe neighborhood has been entered along with instructions on how to leave the dangerous neighborhood. When the PDA 105 belonging to the daughter is in an unsafe geographical area, the portable device can report it to one of the parent's PDA 105.

Similarly, the peripheral devices with which the PDA 105 communicates can vary from family member to family member. For example, the parent's PDA 105 could be configured to interact with the alarm system, kitchen appliances and fire detector. A child's portable device can be configured to interact only with the fire detector and the television. Thus, the child's device would not communicate with kitchen appliances. Nevertheless, both the parent's portable device and the child's portable device would receive an alarm from the fire detector. Moreover, the instrument module 195 with which each of the family member's PDA 105 communicates can also be different.

Figure 9:
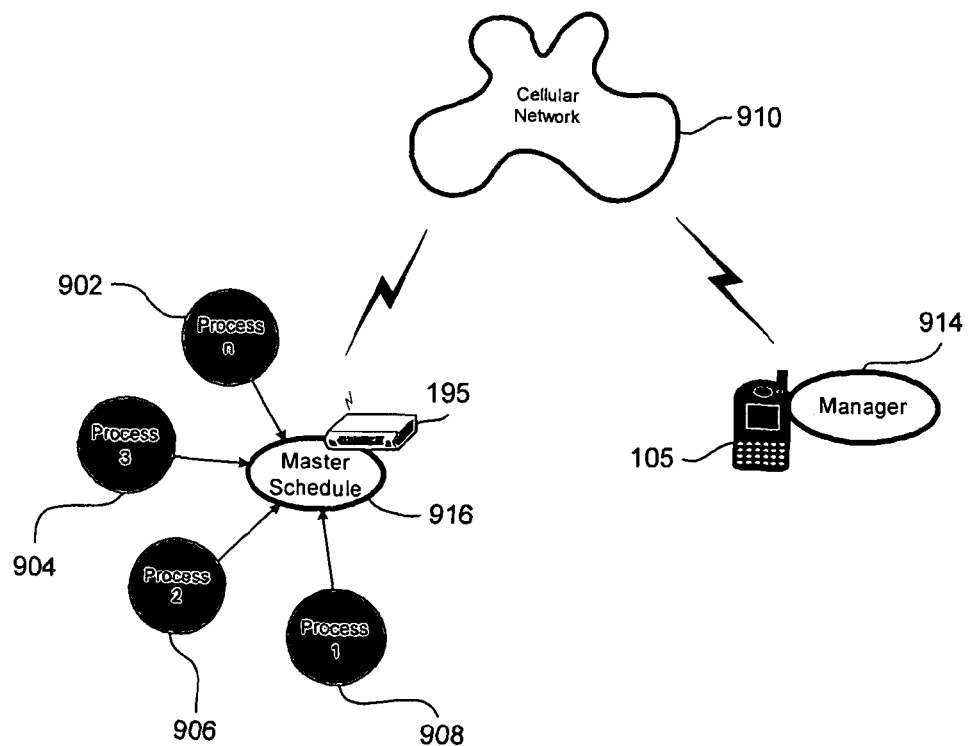
FIG. 9 illustrates a manager that utilizes the PDA to interact with different processes at a remote location configured within the PDA.

FIG. 9 illustrates a manager that utilizes a PDA to interact with different processes at a remote location configured within the PDA. In one embodiment, an individual who is the owner of a manufacturing plant owns a PDA 105 that communicates with devices in the manufacturing plant. The manufacturing plant further includes various processes which are monitored by these devices. The devices communicate with the owner's PDA 105 through an instrument module 195. The instrument module 195 communicates with the PDA 105 over a cellular network 910.

In one embodiment, the instrument module 195 includes a cellular modem that allows it to communicate over cellular network 910 with the PDA 105. The instrument module 195 can then transmit event signals, exceptions, and acknowledgments, to the PDA 105. In another embodiment, the instrument module 195 communicates with the PDA 105 through the Internet. The instrument module can include an Ethernet card that allows the PDA 105 to connect to the Internet and transmit information through a gateway to the PDA 105 over a cellular network 910. In yet another embodiment, the instrument module connects via WiFi, Bluetooth, wireless USB, etc, to the PDA 105 if the PDA 105 is in optimal proximity.

Various processes can be controlled by the owner of the plant. For example, the owner can also play the role of manager 914 and utilizes PDT 105 to remotely control and receive information about various processes at the plant. Thus, the manager 914 can monitor and control in real time automated manufacturing processes 902, 904, 906, and 908. As each process is completed, a master schedule, containing the current state of all ongoing activities, is updated over a local network. A master schedule 916 can reside in a PDA 140, and can include attributes such as completion time for each process. If a process has not been timely completed, the instrument module 195 is configured with an event that notifies the manager 914 that the process has not been completed.

In another embodiment, each change in the master schedule 916 is immediately transmitted to update an identical schedule loaded on the PDA 105 associated with manager 914.

Figure 10:
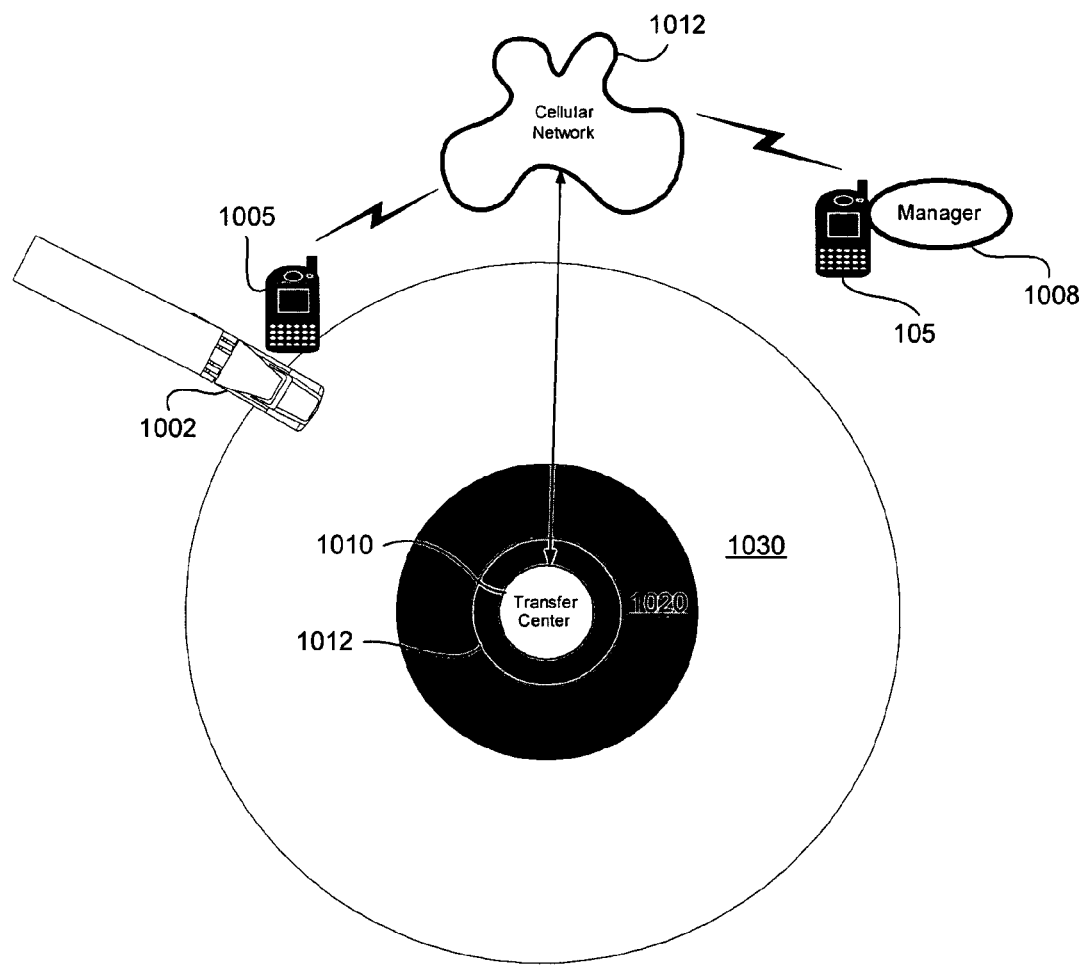
FIG. 10 illustrates a worksite environment in which the PDA operates depending on the proximity of other PDA's to the worksite environment.

FIG. 10 illustrates a worksite environment in which a PDA operates depending on the proximity of other PDA's to a worksite environment. In one embodiment, the manager 1008 of a transfer center 1010 owns a PDA 105 that communicates with an instrument module (not shown) and devices in the transfer center 1010. The instrument module can be connected to a cellular network 1012 that permits connectivity with the PDA 105. In another embodiment, instrument module connects thought the Internet to the PDA 105.

In one example, the transfer center 1010 receives cargo from various states and counties. The driver of an incoming truck 1002 can also be provided with a PDA 1005 that communicates with the transfer center 1010. The PDA 1005 of the driver has a daily schedule and multiple delivery zones loaded in memory. The delivery zones can be boundaries corresponding to zones in which the truck approaches and to which it is traveling.

For instance, truck 1002 is entering zone 1030. As it enters zone 1030, the PDA 1005 may be configured to send an event message to the transfer center 1010 indicating that it has entered a first zone 1030. At the transfer center 1010, the instrument module or another computing device receives the event message that the truck 1002 has entered zone 1030. The instrument module can be configured to trigger an operation when truck 1002 enters zone 1030. Such operation can be, for example, to send a message to PDA 105 indicating that truck 1002 has entered zone 1030. In another embodiment, another operation that can be configured on the instrument module can be to start a process in preparation for the arrival of truck 1002. Such preparation may involve preparing equipment and personnel to receive the cargo. In another embodiment, the operation by the instrument module may be to send a notification to a web server to post on a web page the estimated time of arrival of truck 1002 and its cargo.

As the truck moves closer to the transfer center 1010, further preparation can be carried out. Multiple triggers permit timely and sequenced preparations for the arrival of truck 1002, with the allocation of unloading docks, special tools and equipment, and personnel as required by truck 1002. As other trucks arrive to the transfer center 1010, other events can be configured to occur depending on the truck's information.

The approaching to the transfer center 1010 can continuously create events that trigger preconfigured operations to occur. For example, once the truck enters zone 1020, the PDA 1005 sends a message with condition of the cargo, more accurate estimated time of arrival, traffic conditions, etc. The instrument module at the transfer center 1010 receives the information from the PDA 1005 and executes a corresponding operation depending on the event configured on the instrument module. As the truck enters zone 1012, the PDA 1005 sends another event message to the instrument module indicating that zone 1012 has been entered. The instrument module commands the gate doors to open to truck 1002 to enter the transfer center.

Each of the zones configured in a PDA 1005 can be waypoints, irregular zones, or a combination of multiple waypoints, irregular boundaries, etc. Therefore, in one embodiment, the zones can be a state boundary, the county boundary, the city boundary, and the business land boundary. As the truck enters the state, certain events can be configured to occur. Likewise, as the truck 1002 enters the county boundaries other events can occur and as a result an operation is executed. For example, after entering the county boundaries, the PDA 1005 can shut off the freezer and start defrosting the products. As the truck 1002 enters the city or the vicinity of the destination, other events can occur.

In yet another embodiment, the manager 1008 can communicate with that location over the cellular network 1012 and remotely trigger preparation equipment to receive the arrival. The PDA 105 of the manager may communicate with the instrument module at the transfer center 1010 location and trigger equipment to be deployed, personnel to be notified of an arrival, etc.

While the above description contains many specifics, these should not be construed as limitations on the scope of the disclosure, but rather as an exemplification of one embodiment thereof.

The method and system described above contemplate many applications of the present disclosure. The present disclosure includes a system which has the capability to control and monitor a plurality of instruments or devices at a given geographical location or environment. A geographical location may be a home environment, a business environment, a territory, a country, a land, a region, a province, a terrain, a building, and edifice, a house, a shop, a tent, and any other locality. Movable environments in which the PDA can operate include a vehicle, aircraft, airborne items, animals, persons, cargo, specialized and/or volatile cargo such as chemicals, weapons, or hazardous materials.

Objects or devices that can be monitored and controlled include, but are not limited to, poisoning detecting devices, health monitoring devices, environment control and monitoring devices, military equipment, vehicle operational devices, home appliances, electronic devices, computer devices, etc.

Monitored parameters can be temperature, pressure, humidity, blood pressure, EKG, air pressure, lock control, etc. The PDA is contemplated to be of many different sizes including nano and/or micro scale-PDA.

Furthermore, the disclosure includes any combination or sub-combination of the elements from the different species and/or embodiments disclosed herein. One skilled in the art will recognize that these features, and thus the scope of this disclosure, should be interpreted in light of the following claims and any equivalents thereto.

We claim:

1. A method of selectively communicating with devices within defined geographical zones, comprising:
    defining a plurality of geographical zones, each zone being defined by predetermined attributes;
    associating at least one device within each geographical zone with which a portable device can communicate;
    providing the portable device with a ground positioning unit receiver;
    loading data representative of the plurality of geographical zones to the portable device;
    obtaining geographical coordinates of the portable device from the ground positioning unit receiver;
    determining the location of the portable device in relation to at least one of the plurality of geographical zones; and
    enabling communication with the at least one device associated to the at least one geographical zone when the portable device determines it is within the at least one geographical zone;
    programming the portable device to determine the occurrence of certain conditions in the at least one geographical zone that the portable device is located within the geographical zone,
    wherein the portable device is programmed to determine the occurrence of different conditions dependent on the at least one geographical zone;
    reporting the occurrence of the certain conditions;
    permitting the at least one device to transmit a signal to the portable device indicating the occurrence of an event;
    permitting a microprocessor in the portable device to execute a preconfigured operation if the microprocessor in the portable device determines that the event occurred triggers the execution of the preconfigured operation;
    wherein the portable device is programmed to determine if certain conditions have occurred in the geographical zone, and when a condition occurs the portable device reports the occurrence to a control center or to a second portable device; and
    wherein each geographical zone is depicted as a pixilated computer image created by performing the steps of:
    (a) allowing a user to identify a geometrical area in a computer map using two coordinate attributes;
    (b) dividing the identified geometrical area into a grid; wherein the grid is divided into a number of sections so as to achieve a high enough resolution to be able to correctly delineate the geographical zone;
    (c) allowing the user to select at least one section from within the grid in order to define the geographical zone; and
    (d) associating the at least one section to a pixel in a pixilated computer image such that the pixels selected b the user in the identified geometrical area are identified as being in the geographical zone.

2. The method of claim 1, further comprising providing a module communicatively coupled to at least one device associated to the at least one geographical zone, the module behaving as a hub for communication between the at least one device and the portable device.

3. The method of claim 1, wherein the predetermined attributes are latitude and longitude attributes.

4. The method of claim 1, wherein the portable device is a cell mobile phone, a smart phone, or a personal data assistant.

5. The method of claim 1, wherein the geographical zone is at least one of a home environment, a work environment, a state, a city, a commercial neighborhood, a residential neighborhood, or a school zone.

6. A method of selectively communicating with devices within defined geographical zones, comprising:
    defining a plurality of geographical zones, each zone being defined by predetermined attributes;
    associating at least one device within each geographical zone with which a portable device can communicate;
    providing the portable device with a ground positioning unit receiver;
    loading data representative of the plurality of geographical zones to the portable device;
    obtaining geographical coordinates of the portable device from the ground positioning unit receiver;
    determining the location of the portable device in relation to at least one of the plurality of geographical zones;
    enabling communication with the at least one device associated to the at least one geographical zone when the portable device determines it is within the at least one geographical zone,
    wherein the portable device creates a further representation of the geographical zone using the plurality of coordinates by performing the steps of:
    (a) mapping the coordinates on a pixilated image so as to assign one pixel to each coordinate of the plurality of coordinates,
    wherein the distance between each assigned pixel is configurable,
    (b) connecting the plurality of assigned pixels with lines forming a contiguous and connected line that encloses an area in the pixilated image, and
    (c) activating the pixels that lie on the lines in order to form a contiguous array of pixels that enclose a shape in the pixilated image;
    programming the portable device to determine the occurrence of certain conditions in the at least one geographical zone that the portable device is located within the geographical zone,
    wherein the portable device is programmed to determine the occurrence of different conditions dependent on the at least one geographical zone;
    reporting the occurrence of the certain conditions;
    permitting the at least one device to transmit a signal to the portable device indicating the occurrence of an event;
    permitting a microprocessor in the portable device to execute a preconfigured operation if the microprocessor in the portable device determines that the event occurred triggers the execution of the preconfigured operation;
    wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:
- (a) allowing a user to identify a geometrical area in a computer map using two coordinate attributes;
- (b) dividing the identified geometrical area into a grid; wherein the ~rid is divided into a number of sections so as to achieve a high enough resolution to be able to correctly delineate the geographical zone;
- (c) allowing the user to select at least one section from within the grid in order to define the geographical zone; and
- (d) associating the at least one section to a pixel in a pixilated computer image such that the pixels selected by the user in the identified geometrical area are identified as being in the geographical zone.

7. The method of claim 1, wherein the communication signal between the portable device and the at least one device is a wireless signal.

8. The method of claim 1, further comprising executing a pre-programmed operation, wherein the pre-programmed operation can be a telephone call, reporting to a control center, or starting an alarm.

9. The method of claim 1, wherein the at least one device is a measuring instrument that measures the levels of at least one of carbon monoxide, chlorine, smoke, smog, oxygen in the air, or temperature.

10. A method of selectively communicating with devices within defined geographical zones, comprising:

defining a plurality of geographical zones, each zone being defined by predetermined attributes;

associating at least one device within each geographical zone with which a portable device can communicate;

providing the portable device with a ground positioning unit receiver;

loading data representative of the plurality of geographical zones to the portable device;

obtaining geographical coordinates of the portable device from the ground positioning unit receiver;

determining the location of the portable device in relation to at least one of the plurality of geographical zones;

enabling communication with the at least one device associated to the at least one geographical zone when the portable device determines it is within the at least one geographical zone, wherein data representative of each geographical zone is a pixilated image;

programming the portable device to determine the occurrence of certain conditions in the at least one geographical zone that the portable device is located within the geographical zone, wherein the portable device is programmed to determine the occurrence of different conditions dependent on the at least one geographical zone;

reporting the occurrence of the certain conditions;

permitting the at least one device to transmit a signal to the portable device indicating the occurrence of an event;

permitting a microprocessor in the portable device to execute a preconfigured operation if the microprocessor in the portable device determines that the event occurred triggers the execution of the preconfigured operation;

wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:
- (a) allowing a user to identify a geometrical area in a computer map using two coordinate attributes;
- (b) dividing the identified geometrical area into a grid; wherein the grid is divided into a number of sections so as to achieve a high enough resolution to be able to correctly delineate the geographical zone;
- (c) allowing the user to select at least one section from within the grid in order to define the geographical zone; and
- (d) associating the at least one section to a pixel in a pixilated computer image such that the pixels selected by the user in the identified geometrical area are identified as being in the geographical zone.

11. The method of claim 1, wherein the data representative of each geographical zone is a plurality of waypoints, wherein each waypoint is defined by a geographical coordinate and a radius, wherein the geographical coordinate is represented by a latitude and a longitude, and wherein the radius is represented by a distance magnitude.

12. A method of selectively communicating with devices within defined geographical zones, comprising:

defining a plurality of geographical zones, each zone being defined by predetermined attributes;

associating at least one device within each geographical zone with which a portable device can communicate;

providing the portable device with a ground positioning unit receiver;

loading data representative of the plurality of geographical zones to the portable device;

obtaining geographical coordinates of the portable device from the ground positioning unit receiver;

determining the location of the portable device in relation to at least one of the plurality of geographical zones; and enabling communication with the at least one device associated to the at least one geographical zone when the portable device determines it is within the at least one geographical zone;

programming the portable device to determine the occurrence of certain conditions in the at least one geographical zone that the portable device is located within, wherein the portable device is programmed to determine the occurrence of different conditions dependent on different multiple geographical zones, determining the location of the portable device in relation to at least a second of the multiple of geographical zones; and enabling communication with the at least one device associated to the at least second geographical zone when the portable device determines it is within the at least second geographical zone;

programming the portable device to determine the occurrence of certain conditions in the at least second geographical zone that the portable device is located within the geographical zone, reporting the occurrence of the certain conditions in a respective different geographical zone;

permitting the at least one device to transmit a signal to the portable device indicating the occurrence of an event;

permitting a microprocessor in the portable device to execute a preconfigured operation if the microprocessor in the portable device determines that the event occurred triggers the execution of the preconfigured operation;

wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:
(a) allowing a user to identify a geometrical area in a computer map using two coordinate attributes;
(b) dividing the identified geometrical area into a grid; wherein the grid is divided into a number of sections so as to achieve a high enough resolution to be able to correctly delineate the geographical zone;
(c) allowing the user to select at least one section from within the grid in order to define the geographical zone; and
(d) associating the at least one section to a pixel in a pixilated computer image such that the pixels selected by the user in the identified geometrical area are identified as being in the geographical zone.

13. The method of claim 12, further comprising providing a module communicatively coupled to at least one device associated to the at least one geographical zone, the module behaving as a hub for communication between the at least one device and the portable device.

14. The method of claim 12, wherein the predetermined attributes are latitude and longitude attributes.

15. The method of claim 12, further comprising:
permitting the at least one device to transmit a signal to the portable device indicating the occurrence of an event; and
permitting a microprocessor in the portable device to execute a preconfigured operation if the microprocessor in the portable device determines that the event occurred triggers the execution of the preconfigured operation.

16. The method of claim 12, wherein the portable device is loaded with data for identifying a plurality of instruments associated with each geographical location, and data for identifying a corresponding instrument.

17. The method of claim 12, wherein the portable device is loaded with data for interacting or monitoring a plurality of instruments within each geographical location.

18. The method of claim 17, wherein the portable device is loaded with data for interacting or monitoring a plurality of instruments within each geographical location.

19. A method of selectively communicating with devices within defined geographical zones, comprising:
defining a plurality of geographical zones, each zone being defined by predetermined attributes;
associating at least one device within each geographical zone with which a portable device can communicate;
providing the portable device with a ground positioning unit receiver;
loading data representative of the plurality of geographical zones to the portable device;
obtaining geographical coordinates of the portable device from the ground positioning unit receiver;
determining the location of the portable device in relation to at least one of the plurality of geographical zones; and
enabling communication with the at least one device associated to the at least one geographical zone when the portable device determines it is within the at least one geographical zone;
programming the portable device to identify a plurality of instruments to determine the occurrence of certain conditions in the at least one geographical zone that the portable device is located within,
wherein the portable device is programmed to determine the occurrence of different conditions dependent on different multiple geographical zones,
determining the location of the portable device in relation to at least a second of the multiple of geographical zones; and
enabling communication with the at least one device associated to the at least second geographical zone when the portable device determines it is within the at least second geographical zone;
programming the portable device to determine the occurrence of certain conditions in the at least second geographical zone that the portable device is located within the geographical zone,
reporting the occurrence of the certain conditions in a respective different geographical zone;
permitting the at least one device to transmit a signal to the portable device indicating the occurrence of an event;
permitting a microprocessor in the portable device to execute a preconfigured operation if the microprocessor in the portable device determines that the event occurred triggers the execution of the preconfigured operation;
wherein the portable device is programmed to determine if certain conditions have occurred in the geographical zone, and when a condition occurs the portable device reports the occurrence to a control center or to a second portable device; and
wherein each geographical zone is depicted as a pixilated computer image created by performing the steps of:
(a) allowing a user to identify a geometrical area in a computer map using two coordinate attributes;
(b) dividing the identified geometrical area into a grid; wherein the grid is divided into a number of sections so as to achieve a high enough resolution to be able to correctly delineate the geographical zone;
(c) allowing the user to select at least one section from within the grid in order to define the geographical zone; and
(d) associating the at least one section to a pixel in a pixilated computer image such that the pixels selected by the user in the identified geometrical area are identified as being in the geographical zone.

20. The method of claim 19, wherein the portable device is loaded with data for identifying a plurality of instruments associated with each geographical location, and data for identifying a corresponding instrument.

21. The method of claim 19, wherein the portable device is loaded with data for interacting or monitoring a plurality of instruments within each geographical location.

22. The method of claim 21, wherein the portable device is loaded with data for interacting or monitoring a plurality of instruments within each geographical location.

23. A method of selectively communicating with devices within defined geographical zones, comprising:
defining a plurality of geographical zones, each zone being defined by predetermined attributes;
associating at least one device within each geographical zone with which a portable device can communicate, the association being exclusive of other geographical zones;
providing the portable device with a ground positioning unit receiver;
loading data representative of the plurality of geographical zones to the portable device;
obtaining geographical coordinates of the portable device from the ground positioning unit receiver;

determining the location of the portable device in relation to at least one of the plurality of geographical zones; and enabling communication with the at least one device associated to the at least one geographical zone when the portable device determines it is within the at least one geographical zone;

programming the portable device to determine the occurrence of certain conditions in the at least one geographical zone that the portable device is located within the geographical zone, and there being no communication about conditions when the device is in other geographical zones and the communication being limited to communication about conditions in a single geographical zone, wherein the portable device is programmed to determine the occurrence of different conditions dependent on the at least one geographical zone; and reporting the occurrence of the certain conditions permitting the at least one device to transmit a signal to the portable device indicating the occurrence of an event;

permitting a microprocessor in the portable device to execute a preconfigured operation if the microprocessor in the portable device determines that the event occurred triggers the execution of the preconfigured operation;

wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:

(a) allowing a user to identify a geometrical area in a computer map using two coordinate attributes;

(b) dividing the identified geometrical area into a grid; wherein the grid is divided into a number of sections so as to achieve a high enough resolution to be able to correctly delineate the geographical zone.

(c) allowing the user to select at least one section from within the grid in order to define the geographical zone; and (d) associating the at least one section to a pixel in a pixilated computer image such that the pixels selected by the user in the identified geometrical area are identified as being in the geographical zone.

24. A method of selectively communicating with devices within defined geographical zones, comprising:

defining a plurality of geographical zones, each zone being defined by predetermined attributes;

associating at least one device within each geographical zone with which a portable device can communicate, the association being exclusive of other geographical zones;

providing the portable device with a ground positioning unit receiver;

loading data representative of the plurality of geographical zones to the portable device;

obtaining geographical coordinates of the portable device from the ground positioning unit receiver;

determining the location of the portable device in relation to at least one of the plurality of geographical zones;

enabling communication with the at least one device associated to the at least one geographical zone when the portable device determines it is within the at least one geographical zone, wherein the portable device creates a further representation of the geographical zone using the plurality of coordinates by performing the steps of:

(a) mapping the coordinates on a pixilated image so as to assign one pixel to each coordinate of the plurality of coordinates, wherein the distance between each assigned pixel is configurable, (b) connecting the plurality of assigned pixels with lines forming a contiguous and connected line that encloses an area in the pixilated image, and (c) activating the pixels that lie on the lines in order to form a contiguous array of pixels that enclose a shape in the pixilated image;

programming the portable device to determine the occurrence of certain conditions in the at least one geographical zone that the portable device is located within the geographical zone, and there being no communication about conditions when the device is in other geographical zones and the communication being limited to communication about conditions in a single geographical zone;

wherein the portable device is programmed to determine the occurrence of different conditions dependent on the at least one geographical zone; and reporting the occurrence of the certain conditions permitting the at least one device to transmit a signal to the portable device indicating the occurrence of an event;

permitting a microprocessor in the portable device to execute a preconfigured operation if the microprocessor in the portable device determines that the event occurred triggers the execution of the preconfigured operation;

wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:

(a) allowing a user to identify a geometrical area in a computer map using two coordinate attributes;

(b) dividing the identified geometrical area into a grid; wherein the grid is divided into a number of sections so as to achieve a high enough resolution to be able to correctly delineate the geographical zone.

(c) allowing the user to select at least one section from within the grid in order to define the geographical zone; and (d) associating the at least one section to a pixel in a pixilated computer image such that the pixels selected by the user in the identified geometrical area are identified as being in the geographical zone.

25. A method of selectively communicating with devices within defined geographical zones, comprising:

defining a plurality of geographical zones, each zone being defined by predetermined attributes;

associating at least one device within each geographical zone with which a portable device can communicate, the association being exclusive of other geographical zones;

providing the portable device with a ground positioning unit receiver;

loading data representative of the plurality of geographical zones to the portable device;

obtaining geographical coordinates of the portable device from the ground positioning unit receiver;

determining the location of the portable device in relation to at least one of the plurality of geographical zones;

enabling communication with the at least one device associated to the at least one geographical zone when the portable device determines it is within the at least one geographical zone, wherein data representative of each geographical zone is a pixilated image; programming the portable device to determine the occurrence of certain conditions in the at least one geographical zone that the portable device is located within the geographical zone, and there being no communication about conditions when the device is in other geographical zones and the communication being limited to communication about conditions in a single geographical zone;

wherein the portable device is programmed to determine the occurrence of different conditions dependent on the at least one geographical zone; and reporting the occurrence of the certain conditions permitting the at least one device to transmit a signal to the portable device indicating the occurrence of an event;

permitting a microprocessor in the portable device to execute a preconfigured operation if the microprocessor in the portable device determines that the event occurred triggers the execution of the preconfigured operation;

wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:
(a) allowing a user to identify a geometrical area in a computer map using two coordinate attributes;
(b) dividing the identified geometrical area into a grid; wherein the grid is divided into a number of sections so as to achieve a high enough resolution to be able to correctly delineate the geographical zone.
(c) allowing the user to select at least one section from within the grid in order to define the geographical zone; and
(d) associating the at least one section to a pixel in a pixilated computer image such that the pixels selected by the user in the identified geometrical area are identified as being in the geographical zone.

26. A method of selectively communicating with devices within defined geographical zones, comprising:

defining a plurality of geographical zones, each zone being defined by predetermined attributes;

associating at least one device within each geographical zone with which a portable device can communicate the association being exclusive of other geographical zones;

providing the portable device with a ground positioning unit receiver;

loading data representative of the plurality of geographical zones to the portable device;

obtaining geographical coordinates of the portable device from the ground positioning unit receiver;

determining the location of the portable device in relation to at least one of the plurality of geographical zones; and enabling communication with the at least one device associated to the at least one geographical zone when the portable device determines it is within-the at least one geographical zone;

programming the portable device to determine the occurrence of certain conditions in the at least one geographical zone that the portable device is located within the geographical zone, and there being no communication about conditions when the device is in other geographical zones and the communication being limited to communication about conditions in a single geographical zone;

wherein the portable device is programmed to determine the occurrence of different conditions dependent on different multiple geographical zones, determining the location of the portable device in relation to at least a second of the multiple of geographical zones; and enabling communication with the at least one device associated to the at least second geographical zone when the portable device determines it is within the at least second geographical zone;

programming the portable device to determine the occurrence of certain conditions in the at least second geographical zone that the portable device is located within, and reporting the occurrence of the certain conditions in a respective different geographical zone permitting the at least one device to transmit a signal to the portable device indicating the occurrence of an event;

permitting a microprocessor in the portable device to execute a preconfigured operation if the microprocessor in the portable device determines that the event occurred triggers the execution of the preconfigured operation;

wherein the portable device is programmed to determine if certain conditions have occurred in the geographical zone, and when a condition occurs the portable device reports the occurrence to a control center or to a second portable device; and wherein each geographical zone is depicted as a pixilated computer image created by performing the steps of:
(a) allowing a user to identify a geometrical area in a computer map using two coordinate attributes;
(b) dividing the identified geometrical area into a grid; wherein the grid is divided into a number of sections so as to achieve a high enough resolution to be able to correctly delineate the geographical zone.
(c) allowing the user to select at least one section from within the grid in order to define the geographical zone; and
(d) associating the at least one section to a pixel in a pixilated computer image such that the pixels selected by the user in the identified geometrical area are identified as being in the geographical zone.

* * * * *